US006961954B1

(12) United States Patent  
Maybury et al.

(10) Patent No.: US 6,961,954 B1  
(45) Date of Patent: Nov. 1, 2005

(54) AUTOMATED SEGMENTATION, INFORMATION EXTRACTION, SUMMARIZATION, AND PRESENTATION OF BROADCAST NEWS

(75) Inventors: Mark T. Maybury, Chelmsford, MA (US); Andrew E. Merlino, Jr., Burlington, MA (US)

(73) Assignee: The Mitre Corporation, McLean, VA (US)

( * ) Notice: Subject to any disclaimer, the term of this patent is extended or adjusted under 35 U.S.C. 154(b) by 0 days.

(21) Appl. No.: 09/033,268

(22) Filed: Mar. 2, 1998

Related U.S. Application Data

(60) Provisional application No. 60/065,947, filed on Oct. 27, 1997.

(51) Int. Cl.[7] .......................... G06F 3/00; G06F 13/00; H04N 5/445
(52) U.S. Cl. ............................. 725/53; 707/3
(58) Field of Search ............... 725/52, 38, 51, 725/53, 48, 50, 61, 136, 139; H04N 5/445; G06F 3/00, G06F 13/00; 707/3, 10

(56) References Cited

U.S. PATENT DOCUMENTS

| | | | |
|---|---|---|---|
| 4,739,398 A | 4/1988 | Thomas et al. ............... 358/84 |
| 5,187,787 A | 2/1993 | Skeen et al. ................ 395/600 |
| 5,436,653 A | 7/1995 | Ellis et al. ..................... 348/2 |
| 5,481,296 A | 1/1996 | Cragun et al. ................ 348/13 |
| 5,504,518 A | 4/1996 | Ellis et al. ..................... 348/2 |
| 5,561,457 A | 10/1996 | Cragun et al. ................ 348/13 |
| 5,614,940 A | 3/1997 | Cobbley et al. ............... 348/7 |
| 5,752,029 A * | 5/1998 | Wissner ..................... 345/302 |
| 5,821,945 A * | 10/1998 | Yeo et al. ................... 345/440 |
| 5,918,223 A * | 6/1999 | Blum et al. .................... 707/1 |
| 6,263,507 B1 * | 7/2001 | Ahmad et al. .............. 725/134 |
| 6,278,446 B1 * | 8/2001 | Liou et al. .................. 345/328 |
| 6,340,971 B1 * | 1/2002 | Janse et al. ................. 345/327 |

OTHER PUBLICATIONS

Hauptmann, A.G. et al., "Informedia: News-on-Demand Multimedia Information Acquisition and Retrieval," pp. 214-239.
Zhang, H.J. et al., "Video Parsing, Retrieval and Browsing: An Integrated and Content-Based Solution," *Multimedia '95*: 15-24 (1995).
Brown, M.G. et al., "Automatic Content-Based Retrieval of Broadcast News," *Multimeda '95*: 35-43 (1995).
Shahraray, B., et al., "Automated Authoring of Hypermedia Documents of Video Programs," *Multimedia '95*: 401-409 (1995).
The MITRE Advanced Technology Newsletter, "The Edge," vol. 01 (2) (1997).
Televitesse, "1996 Annual Report," (1996).
"Context Summarization—A Technology Overview," Televitesse Confidential (1997).
Desktop Data, Inc. (1997).

(Continued)

*Primary Examiner*—Vivek Srivastava
(74) *Attorney, Agent, or Firm*—Hamilton, Brook, Smith & Reynolds, P.C.

(57) ABSTRACT

A technique for automated analysis of multimedia, such as, for example, a news broadcast. A Broadcast News Editor and Broadcast News Navigator system analyze, select, condense, and then present news summaries. The system enables not only viewing a hierarchical table of contents of the news, but also summaries tailored to individual needs. This is accomplished through story segmentation and proper name extraction which enables the use of common information retrieval methodologies, such as Web browsers. Robust segmentation processing is provided using multi-stream analysis on imagery, audio, and closed captioned stream cue events.

25 Claims, 22 Drawing Sheets

OTHER PUBLICATIONS

Merlino, A., et al., "Broadcast News Navigation using Story Segmentation" The MITRE Corporation (1997).

Maybury, M., et al., "Segmentation, Content Extraction and Visualization of Broadcast News Video using Multistream Analysis" The MITRE Corporation (1997).

Maybury, M., et al., "Multimedia Summaries of Broadcast News" The MITRE Corporation (1997).

Tag Frequencies for the Last 3 Months (1997).

* cited by examiner

State_ID    Description

1   Start
2   Wait for Broadcast Start
3   Highlights Begin
4   Highlights are ending
5   Story Segment Detected
6   Start of Story
7   Near end of Story
8   Advert Story Segment
9   Wait for Advert End
10  Broadcast End Story Segment
11  Broadcast Over
12  Story Buffer
13  Possible Advertisement
14  Very Possible Advertisement
15  Prime Possible Advertisement
16  Prime Highlight
17  Very Near Start
18  Possible end of Broadcast
19  Very Possible End
20  End Story Segment
21  End Broadcast
22  Reporter Segment

FIG. 12

Broadcast News Navigator Story Search Tool

Select the type of News source(s), the period of time, and the types of tags you are interested in searching:

News Source

- 60 Minutes
- ABC News Nightline
- ABC World News
- Andy's Story Segmentation Evaluation
- CBS Evening News
- CNN Early Prime
- CNN Headline News
- CNN International

Broadcast Dates

◻ From Date [01 ▷] [JAN ▷] [1996 ▷]

To Date   [01 ▷] [JAN ▷] [1996 ▷]

◻ Last 24 hrs
◻ Last 3 days [From 24-SEP-1997]
◻ Last Week [From 20-SEP-1997]
◻ Last 2 Weeks [From13-SEP-1997]
◻ Last Month [From 28-AUG-1997]
◻ Last 3 Months [From 29-JUN-1997]
◻ Last 6 Months [From 28-MAR-1997]
◻ Last Year [From 27-SEP-1996]

Type of Search

☑ Text Search
☐ Topic Search
☐ Person Search
☐ Organization Search
☐ Location Search

- Project
  BNN Home

- Overview

- Search BNN by:

Browse for Stories

Search for Stories

BNN Usage

- Browse Other Sources:

AUTOMATED SEGMENTATION, INFORMATION EXTRACTION, SUMMARIZATION, AND PRESENTATION OF BROADCAST NEWS

CROSS-REFERENCE TO RELATED APPLICATION

This application claims the benefit of a prior United States Provisional Application entitled "Multimedia Summaries of Broadcast News," Ser. No. 60/065,947 filed on Oct. 27, 1997.

BACKGROUND OF THE INVENTION

Advances in video and computing technologies are enabling the production of increasing amounts of multimedia information in the form of broadcast radio and television programs, video recordings, multimedia software, Web pages, and the like. The now widespread popularity of broadcast news services such as the Cable News Network (CNN), news documentary programs such as produced by the Public Broadcasting System (PBS), and computerized interactive media such as the Web pages provided by USA Today, have made it clear that the value of multimedia information has expanded beyond transient communication and entertainment to become a serious form of business communication, advertisement, historical record and research tool.

Researchers have long used content summaries as a valuable way to locate source material. In the case of printed media such as books or magazines, it is fairly simple to create an index or abstracts of contents at the expanded beyond transient communication and entertainment to become a serious form of business communication, advertisement, historical record and research tool.

Researchers have long used content summaries as a valuable way to locate source material. In the case of printed media such as books or magazines, it is fairly simple to create an index or abstracts of contents at the time that the source material is edited or typeset. The indexes, abstracts, or even the full text can then be maintained in the form of computer files; indeed, in most cases, the source information now originates as word processing files. Standard data base software can then be used to search for information of interest, and there are many different examples of such systems in commercial operation at the present time. Some of these systems exploit techniques to automatically summarize text. These include simply selecting a predetermined number of the initial words, measuring word-frequency distributions, detecting clue phrases (e.g., "in summary," "the most important"), or reasoning about the discourse and/or rhetorical structure.

Just as content abstraction techniques have been found to be quite valuable for managing printed text materials, multimedia sources would ideally be available with similar facilities to support real-time profiling as well as retrospective search. Unfortunately, unlike printed media, the innate continuous and visual nature of multimedia information makes it relatively difficult to catalogue. At the present time, it is common to employ data analysts to manually view, search, extract, transcribe, summarize, visualize, annotate, and segment multimedia information sources for a subject of interest or discovery of trends. These manual annotation techniques suffer from problems of accuracy, consistency (when performed by more than one operator), timeliness, scalability, and cost.

Certain techniques have been developed to automatically create time indices based on visual transitions in the multimedia image stream (e.g., dissolve, fade, cut) and shot classification (e.g., news anchor shot versus story shots). See, for example, Zhang, H., et al., in "Video Parsing, Retrieval and Browsing: An Integrated and Content-Based Solution," *Proceedings of ACM Multimedia '95*, pp. 15–24. Certain other researchers have specifically investigated the linguistic aspects of video such as closed captioned text or transcripts, and provided for the indexing of key words with associated key video frames to create a static and/or hypertext depiction of television news. See Shahraray, B., et al., in "Automated Authoring of Hypermedia Documents of Video Programs," *Proceedings of ACM Multimedia '95*, pp. 401–409, and Liang, Y., et al., in "A Practical Video Database Based on Language and Image Analysis," *AAAI Spring Symposium*. 1997, pp. 127–132. More complex linguistic processing is reported in Taniguchi, et al., "An Intuitive and Efficient Access Interface to Real-Time Incoming Video Based on Automatic Indexing," *Proceedings of ACM Multimedia '95*, pp. 25–34, who use Japanese topic markers such as "ex ni tsuite" and "wa" ("with regard to", "as for"), as subject key word markers. Unfortunately, such key word indices, even when supplemented with linguistic processing to address complexities such as synonymy, polysemy, and co-reference, typically only support more traditional search and retrieval tasks. Brown, M. G., et al., in "Automatic Content Based Retrieval of Broadcast News," *Proceedings of ACM Multimedia '95*, pp. 35–44, provide content-based access to video using a large scale, continuous speech recognition system to transcribe the associated audio. And, Hauptmann, A., et al., in "Informedia: News on Demand Multimedia Information Acquisition and Retrieval," *Intelligent Multimedia Information Retrieval*, (Cambridge, Mass.: AAAI Press, 1997), pp. 215–239, perform a series of analyses including color histograms, optical flow analysis, and speech transcription.

SUMMARY OF THE INVENTION

The techniques noted above do not automatically perform the segmentation, content extraction, and summarization believed to be more useful for higher level browsing search or analysis of news broadcast representations, however. Therefore, the present invention is a way to automatically annotate and summarize multimedia data representative of the information in a news broadcast so that it may be visualized, searched, and disseminated in a manner which is compatible with popular browsing tools originally developed for text-based documents. Segmentation, extraction and summarization also enable more timely and efficient (for example, "low bandwidth") communication and storage of multimedia data.

In one aspect, the invention automatically correlates event cues in multiple media streams to improve story segmentation performance by using a finite state machine enhanced with temporal information.

The segmented source material may then be further processed to provide for the extraction of facts from the linguistic stream, representative key frames to permit visualization of extracted information, and even the identification of trends and patterns within news stories.

The invention also provides for integration of image, audio and language processing techniques to support automated story summarization, making use of algorithms for proper name, key phrase, and key frame extraction. The system is thus capable of generating multimedia summaries and trend analysis tailored to a user query in a Web browser format.

While the primary focus is on automated processing of broadcast news sources, the invention may also be applied to any structured multimedia source as well, such as documentary videos, radio broadcast, surveillance videos, amateur home videos, and the like. Different news sources require only the creation of different finite state machines which capture the appropriate broadcast state models for segment classification.

In one particular aspect, the invention is a method for automatically processing, in real time, a media presentation such as a news broadcast to generate representations of story segments contained therein. The method consists of creating a finite state representation of the expected structure of the media presentation including at least a news story state and an advertising state, with state transitions being indicated by events occurring within the media presentation. Portions of the media presentation are then selected as news story segments by correlating events detected within at least one information stream in the media presentation with the state transitions in the finite state representation.

The events may include both intrastream cues, that is, events occurring within a given one of several multimedia information streams or channels (for example, audio, video, or closed captioned text), or may also be interstream cues, that is, events occurring across multiple streams. For example, a black frame in the video stream and silence in the audio stream may indicate the onset of a segment transition.

The correlated events may occur as intrastream cues in a text information stream as provided by closed captioning or by speech recognition of an audio stream. These intrastream cues may include token phrases indicative of introductory news broadcast terms, anchor to reporter hand-off phrases, reporter to anchor hand-off phrases, leaders to highlights of upcoming news stories, or sign-off phrases.

For example, introductory news broadcast terms may include phrases such as "I'm", "hello", "welcome", "hello from", "welcome to", "thanks for watching", "thanks for joining us", and "here on". Anchor to reporter phrases may include a station or network identification with a reporter named entity, a reporter named entity with the phrase "joins us", or a reporter named entity with the phrase "reports". Reporter to anchor phrases may include a station identification with a reporter named entity, a reporter named entity with a located named entity, "back to you", and "thank you". Highlight leaders may include such phrases as "coming up", "next on", "ahead on", "when" together with a station identification and "returns", and "also ahead". Sign-off phrases may include "that wraps up", "that is all", "that's all", "that's" together with a news program identification, "thanks for watching", and "thanks for joining us".

In yet another particular aspect of the invention, a multimedia source is automatically processed to generate representations of story segments contained therein by a method of detecting interstream, cross-channel event cues occurring in multiple information channel streams, including event cues in an image stream, an audio stream, and a text stream, for example. Redundancy in these cross-channel event cues is exploited by including them in a logical representation of an expected event structure of the media presentation.

The expected event structure may include indicators of relatively high level media presentation states such as before start of broadcast, start of broadcast, highlight segment, advertising, story start, story end, before end of broadcast, and end of broadcast.

Event cues specifically for the image stream, used for example to detect scene changes, may be detected by categorizing types of image frames such as black frame, logo frame, single anchor frame, double anchor or reporter frame.

Event cues in the audio stream may include but are not limited to silence detection and speaker change detection.

Event cues in the text stream may be determined by detecting the occurrence of named entities, such as persons, locations, and organizations.

The invention also provides for automatically processing a media presentation by dividing the media presentation into one or more news story segments, processing a textual portion of the new story segments to detect named entities (such as people, places, organizations, dates, etc.) referred to therein; and then displaying the named entities associated with each news story segment. The named entities may be displayed together with an imagery frame selected from each news story segment, or a graph of frequency versus time of occurrence of the associated news story segment. Additionally, a story summary, topic, gist and full source text can be matched with the above components.

BRIEF DESCRIPTION OF THE DRAWINGS

The above and further features of the invention include various novel details of construction and combination of components. These novel features will be more particularly pointed out in the following claims, and their advantages will also become evident as they are described in detail with reference to the accompanying drawings, in which:

FIGS. 11 and 12 are more detailed diagrams of the finite state machine;

FIG. 15 is a source, type and date/time search query page;

FIGS. 16 and 17 are views of thumbnail type search results pages;

DETAILED DESCRIPTION OF A PREFERRED EMBODIMENT

A. Introduction and System Architecture

Figure 1:
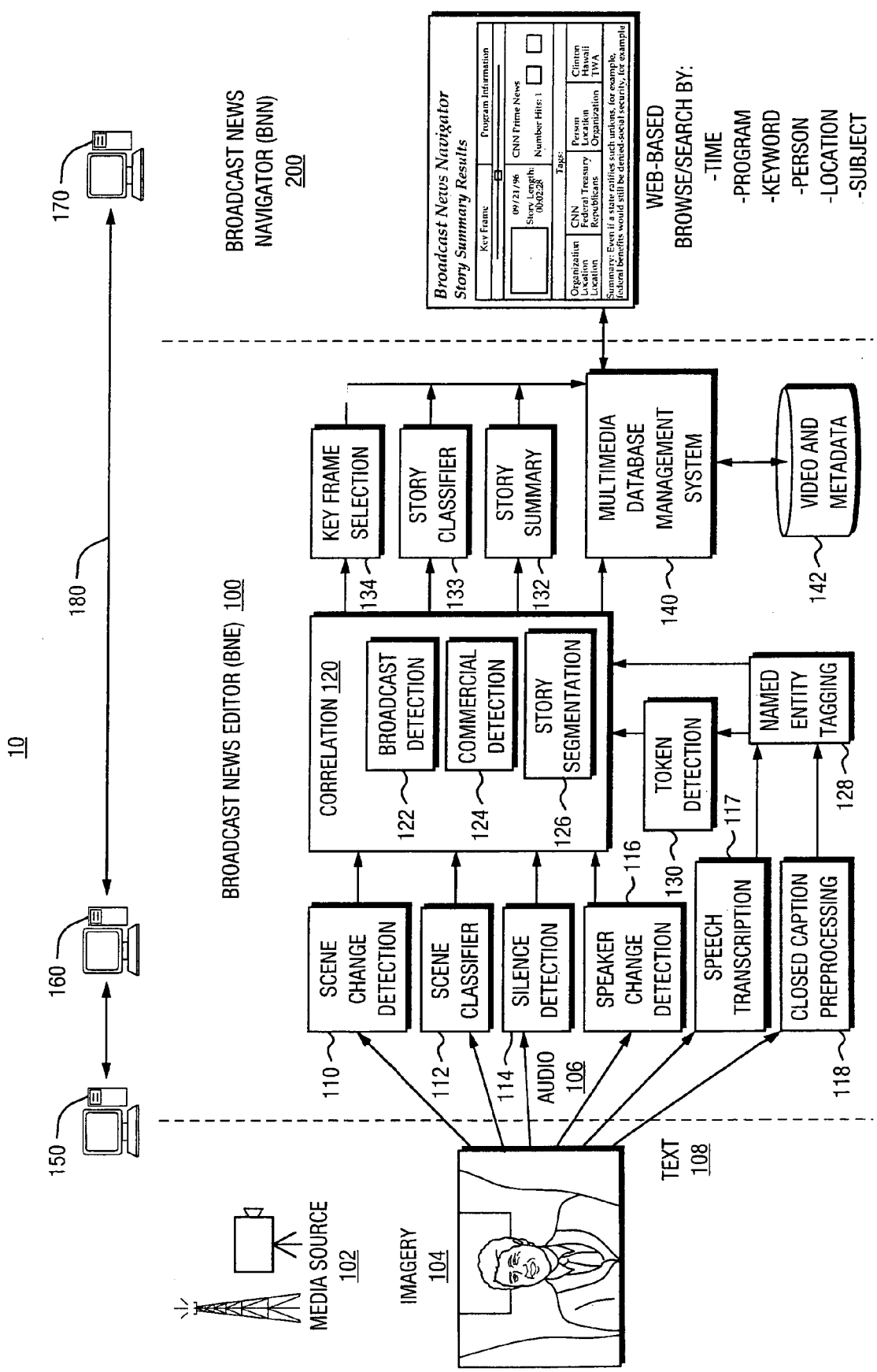
FIG. 1 is a block diagram of an automated system for analyzing, selecting, condensing and presenting information derived from broadcast news according to the invention.

Turning attention now to FIG. 1 in detail, an automated system 10 for content-based segmentation, information extraction, summarization and presentation of the content of a video program such as a news broadcast is shown in block diagram form. The functional aspects of the system 10 are divided into a news analysis subsystem 100 referred to as the Broadcast News Editor™ (BNE) and a news information browsing subsystem 200 referred to as the Broadcast News Navigator™ (BNN). BNE and BNN are trademarks of The MITRE Corporation of McLean, Va.

The Broadcast News Editor 100 consists of segmentation, extraction and summarization functions described below in further detail. It typically operates automatically such as every evening, according to a preprogrammed schedule of news broadcasts.

The Broadcast News Navigator 200 provides a presentation interface for the data produced by the Broadcast News Editor 100 in real time. It typically provides such data in response to user queries in a convenient form such as a World Wide Web page using Hypertext Markup Language (HTML) and/or Java applets.

In terms of physical hardware, the system 10 preferably consists of a number of network computing systems, including a front end Intel Pentium-based personal computer 150, a UNIX-based file server 160 such as available from Sun Microsystems of Santa Clara, Calif., and a browser enabled client workstation 170, also a personal computer. In general, the personal computer 150 is responsible for capturing and converting information from a news media source 102 into digital form. The UNIX server 160 is used to provide portions of both the BNE 100 and BNN 200 subsystem functions. The client workstation 170 is used to browse the formatted information. This enable users of multimedia platforms to access multimedia content via browser programs.

After the front end processor 150 captures this data from the various streams in the media source 102, it passes data files to the UNIX server 160 for further processing. The UNIX server 160 is then responsible for processing the converted information from various information streams in the media source 102, including video imagery data 104, audio sample data 106, and closed captioned text data 108. The image data 104, for example, may be stored as an MPEG format file, the audio as an MPA format file, and the closed captioned text information as a text file.

The files representing the imagery 104, audio 106 and closed captioned text 108 streams are then fed to the Broadcast News Editor 100 to complete various functions for segmentation and classification of the news program. Those functions include scene change detection 110, scene classification 112, silence detection 114, speaker change detection 116, speech transcription 117, and closed captioned preprocessing 118. The outputs of these functions are provided to a correlation process 120, which performs multiple functions such as broadcast detection 122, commercial detection 124, and story segmentation 126. Named entity tagging 128 and token detection 130 also provide inputs to the correlation process 120. The outputs of the correlation process 120 are fed to story summary 132, story classifier 133 and key frame selection 134 processes as well.

The results of the above process are stored in the relational multimedia database management system 140 and video server and media storage 142. This data are then made available to the browser-enabled client 170 over a network connection 180 such as the Internet, a corporate Internet or other computer network.

Figure 2:
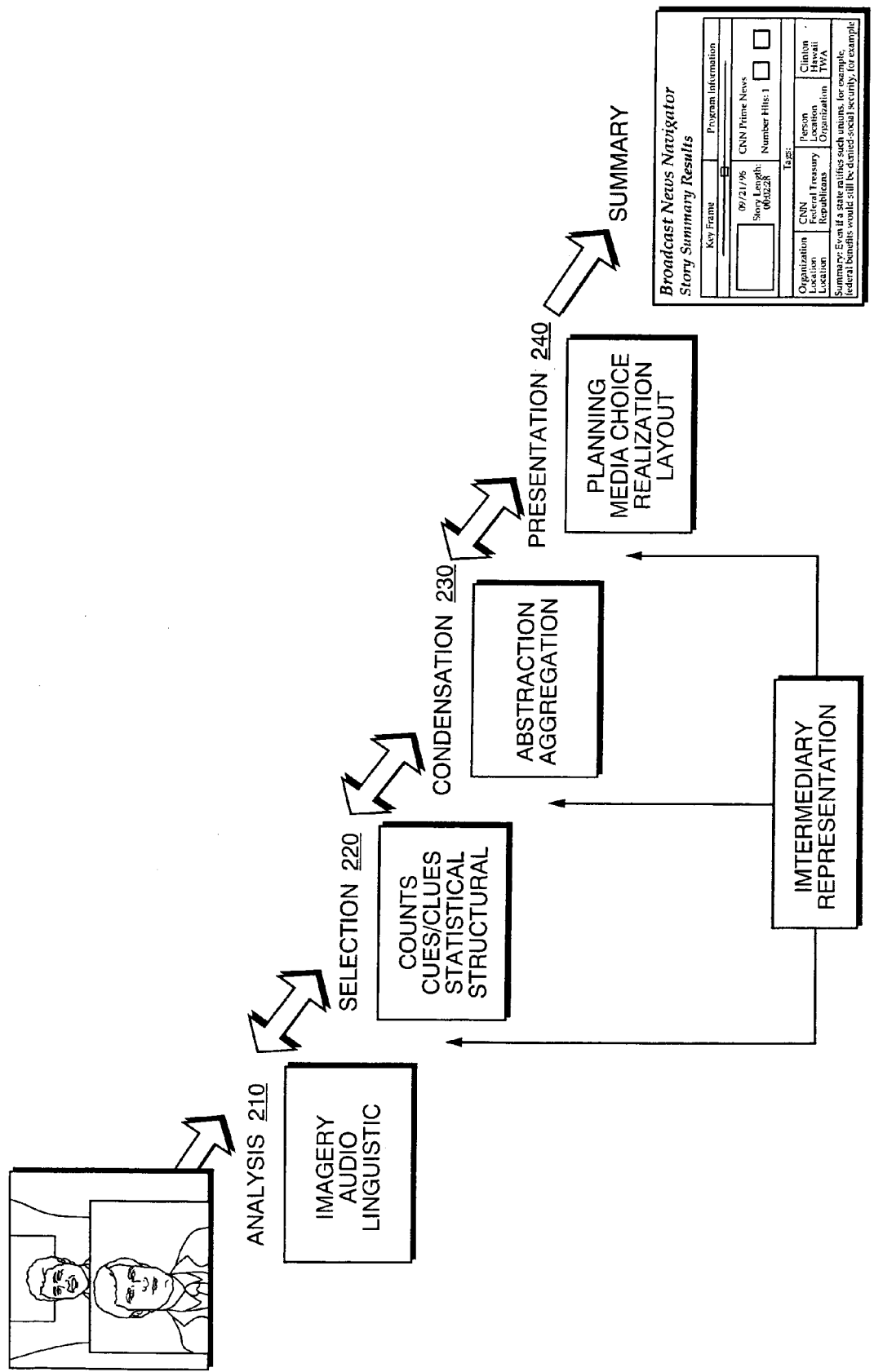
FIG. 2 is a high level flow diagram of an automated news broadcast summarization process.

Before proceeding with a detailed discussion of how these various functions achieve broadcast news segmentation and summary according to the invention, it will help to understand certain basic steps of the automated summarization process. These basic processes, as shown in FIG. 2, include analysis 210, selection 220, condensation 230, and presentation 240.

Within the analysis function 210, information is selected from the input media source and condensed into compact form. The selection function 220 selects such information based upon frame counts, cues, and other clues, such as by using priori structural understanding of the news program content. The condensation function 230 provides further compacting of the information by automated extraction and aggregation, together with a generation of a summary tailored to the interests of the particular user. The presentation function 240 focuses on the manner of presenting condensed information to the user in a sensible manner based upon type of media, desired layout, and end user tool realization.

More particularly now, in the specific instance of addressing the analysis of broadcast news programs, the analysis function 210 includes detection of discourse structure, such as anchor to reporter handoffs, commercials, interview segments, and other aggregatable program elements as occurring in the individual imagery 104, audio 106, and text 108 streams. The output of analysis 210 is an annotated version of the source information; this data is stored in the database management system 140 with pointers to related and other temporal references to a source file in order to permit later retrieval of specific segments.

Once the source content has been analyzed 210, the next step in summarization is content selection 220. Content may be selected from individual video channels (in other words, selecting just the imagery 104, audio 106, or closed captioned text 108). In other instances, content may be selected from several information streams synchronously, such as in the case of a video clip. In still other instances, content may include elements selected from several temporally distinct portions of different streams to be integrated into a composite summary segment. For example, it may be desirable to select a key frame from an imagery stream 104 and store that together with audio data 106 taken from a different place in the source 102.

The simplest content selection technique is to count image frames, such as selecting the first few frames of the imagery 104, first few words of the text 108, or first few seconds of audio 106. A slightly more sophisticated content based selection algorithm is to exploit clues that might identify key passages. For example, the selection process 220 may detect spoken or closed captioned token phrases such as "in summary", "the most important"; similar spoken language cues in the audio stream; or images that contain predetermined, known visual features that would serve as informative key frames such as on screen logos, anchor/reporter names or locations; or significant changes in the color, text, or shape of image frames indicating new scene content. In addition to these syntactic cues, other summarization techniques may statistically analyze the frequency of occurrence of words, images, or sounds as indicative of the most common or most important content.

Another method of content selection 220 involves compilation of "video discourse" or camera motions, such as cut, pan, or zoom to guide the extraction of key frames. A camera zoom may, for example, be represented by a situating shot extracted from the beginning of the zooming segment, followed by a key frame selected from the end of the zooming segment representing the target of the zoom. Higher level structural feature extraction may include, for example, in a broadcast news program, deleting commercial segments while retaining segments that contain top of the news summaries.

In the preferred embodiment of the invention, the content selection process 220 extracts a multistream summary, including (1) a textual summary consisting of the first sentence of the closed captioned text or the sentence containing the words which collectively have the highest named entity frequency of occurrence within the story, or if the named entity frequency is equal for more than one sentence, the sentence which occurs first in the story is selected, (2) a key imagery frame based upon the type of segment (e.g., news preview/highlights, anchor segment, reporter segment, or weather segment), and (3) the six most frequently occurring named entities or key phrases in the story as detected from the closed captioned text.

Following selection 220, the condensation process 230 may be used to further condense the material whereby similar content is aggregated. For example, if several equivalent key imagery frames are determined to be highly indicative of the source content, a simple exemplary key frame can be used to represent all such frames. As described further below, this is also the preferred manner of operating for named entity extraction (that is, following an extraction of multiple occurrences of the same person, organization, or location, they are consolidated). Similarly, if several similar but not identical entities or events are to be extracted, these can be combined into a higher level class to be expressed. An example of this can occur when a commercial airplane crash and an air show collision are both in the news and they can be represented as two aviation accidents. As another example, if only named entities of a particular type are mentioned in a story, they may be used to describe the story type (e.g., a story about a location) or search stories by type (e.g., find all stories about people).

Finally, a presentation process 240 generates a multimedia summary and generally encompasses several tasks, including the planning of the structure of the presentation, including an order of the content to be presented. To ensure coherence, this may also include selecting output media (text, imagery, audio) appropriate to the end user's task and environment, and realizing and laying out the content in an effective manner. Unlike simple text summarization, the automated presentation process 240 draws source material from any or all of the imagery 104, audio 106, or text 108 streams or by combining information from more than one stream. In the present embodiment, the realization and layout is typically within the confines of presenting an electronic document form suitable for presentation by a Web-compatible browser program.

B. Broadcast News Editor (BNE)

This section describes the various processes performed by the Broadcast News Editor 100 in more detail. Returning attention to FIG. 1, the overall purpose of the Broadcast News Editor 100 is to provide high performance content-based access to the news in an efficient and effective manner. This is accomplished by independent detection of events or other cues in the multiple information streams (imagery 104, audio 106, and text 108) of the media source 102, and then correlation such events with a model of expected new broadcast behavior. The image data 104 is first processed by the scene change detection process 110 such as provided by the Scene Stealer™ hardware and software product available from Dubner International, Inc. Scene change detection 110 operates to sample video frames and then determine frames where various types of changes in the scene occur, as described below in greater detail. The imagery stream 104 is also processed through a signal-processing program that identifies the frames that are most equivalent to these models over selected periods of time, typically by extracting and storing them at one second intervals.

Scene change detection 110 is augmented by key frame selection heuristics that are engineered based upon the structure of individual video programs. For example, the key frame selection 134 may select a representative or "key" video frame based upon the structure of individual video programs known in advance. For example, the key frame for a story containing a reporter segment is typically selected from the center of the reporter segment. A key frame for a news anchor segment may be taken from the beginning of the segment. However, for a story containing an anchor segment followed by a reporter segment, the key frame selector 134 will chase the frame which occurs in the center of the reporter segment. Other types of segments may have other types of key frame heuristics.

Audio analysis includes silence detection 114 and speaker change detection 116. Silence detection 114 is determined based upon low energy levels in the audio signal (for example, 0.7 seconds of low observed signal energy can be used as the criteria). The speaker change detection process 116 divides the audio stream 106 into a series of non-overlapping windows of predetermined lengths, such as 2, 5, 10, and 20 seconds. Feature vectors are then derived for each window using a difference metric to measure the relative change from window to window. Changes exceeding a threshold are identified as a speaker change event.

The closed captioned text 108 is processed by the closed captioned preprocessing 118 to automatically detect textual cues indicative of commercials and story segments in accordance with techniques which are further described below. In an alternate embodiment, spoken language automatic transcription 117 can provide a similar function to the closed captioned preprocessing 118 in a system in which closed captioned text is not directly provided by the video source 102. The closed captioned preprocessing 118 removes non-ASCII characters.

The named entity tagging process 128 extracts named entities from the closed captioned stream 108 such as people, places, and things. This is accomplished by detecting clue words and other linguistic indicators of such named entities. Story boundaries may also be detected in a similar manner.

The difficulty with attempting to segment a news broadcast by using only closed captioned text events is that the text stream is typically characterized by ungrammatical, upper case-only text. Therefore, applying capitalization cues alone, for example, cannot typically be used for named entity detection. Furthermore, errors of stenographic transcription (e.g., insertion, substitution, and deletion of characters in transcribed words) result in 2–20% word error rates in various news broadcast sources.

To overcome these difficulties in the closed captioned preprocessing 118, which would be less than ideal operating on its own, the correlation process 120 exploits cue event redundancy among all of the various streams 104, 106, and 108. For example, a detected black frame in the imagery data 104 may be temporally synchronous with silence in the audio data 106. This may be used to determine a commercial boundary. A cross-channel correlation such as detecting a broadcast logo in the imagery data 104 with a linguistic utterance such as "Good Night" in the closed captioned text 108 may be used to detect a program end.

To better understand how the correlation 120 process operates, consider that a broadcast news program tends to follow a general format across the entire program. Even within a story segment, a news broadcast can typically be broken down into a series of expected "states." Such states, for example, may include "Start of Broadcast", "Advertising", "New Story", and "End of Broadcast". Multi-stream cues, including time, may then be used to detect when a state transition has occurred. In other words, these parallel sources of segmentation information are used to navigate a state transition table, including cues from the image stream 104, discourse cues from the audio stream 106, and text cues from the closed captioned stream 108. Together, these provide redundant segmentation cues that are correlated and exploited to achieve higher precision in element segmentation.

Exemplary Segmentation for CNN Prime News

Consider as one example of a preferred embodiment of the invention an observation of the format of Cable News Network's (CNN's) evening PrimeNews program. A Prime News broadcast includes events typical of all news broadcasts, such as a start and end portion having with an anchor person segment, reporter segments preceded by an introductory anchor segment, and commercials segments serving as story boundaries.

However, each news program has a specific multimedia "vocabulary" of expected events peculiar to itself which can be exploited to identify structure and extract individual segments. CNN's PrimeNews broadcast typically has a multimedia vocabulary that includes the following states indicated by various visual, audio, and text cues:

Before Start of Broadcast. This state lasts an unknown period of time before the PrimeNews broadcast actually begins. The recognition of this state permits the correlation process 120 to analyze videotapes of the broadcast and other sources where the broadcast does not start at a fixed time of day.

Start of Broadcast. This is a transition state immediately before the start of the broadcast. The CNN logo is displayed in the video stream. There is typically a fade from black to the logo. As the logo is displayed, the audio stream contains a recording of James Earl Jones saying "This is CNN".

Highlights. This state lasts from 30–90 seconds. During this state, the CNN anchor introduces the top stories that will be covered in the full broadcast, typically with 5–15 second long story "teasers". An audible jingle is heard in the background.

End of Highlights. This is another transition state where the anchors typically introduce themselves and state the date.

Start of Story. At the start of a story, one anchor is speaking, typically in the anchor booth. Stories can last anywhere from 15 to 360 seconds. The anchor may transition to a reporter or to a topic expert, who typically then continues the same story. A graphic will often accompany the anchor at the start of a story.

End of Story. A transition state where the reporter or topic expert will transition back to the anchor in the anchor booth. In addition, the anchor that is speaking will often transition to the other anchor.

Within Broadcast Highlights. Typically about 15 minutes into the broadcast, another highlight section occurs for the remaining stories. This segment lasts from 15 to 45 seconds, with the individual story teasers being from 5 to 15 seconds long. An advertising segment always follows this state.

Advertising. Advertising states last from 90 to 240 seconds and consist of a series of 15-, 30- or 60-second commercials. The advertiser always records the commercials, they are never delivered by an anchor.

Before End of Broadcast. A transition state where the anchors sign off from the program and inform the audience of upcoming programs on CNN.

End of Broadcast. This state lasts an unknown period of time after the broadcast has finished until the next broadcast begins. There is usually a fade to a black frame within this state.

A significant aspect of the Broadcast News Editor 100 includes the various elements which determine when a specific news broadcast is in each of these states. To detect when a state transition occurs, cues from the imagery 104, audio 106, and text 108 streams are detected as well as a time reference. When one of the analysis programs detects a cue, the event is stored in an integrated relational table in the database management system 140 by broadcast, cue type and time stamp. This integrated relational table allows rapid and efficient story segmentation by the correlation process 120.

Figure 5:
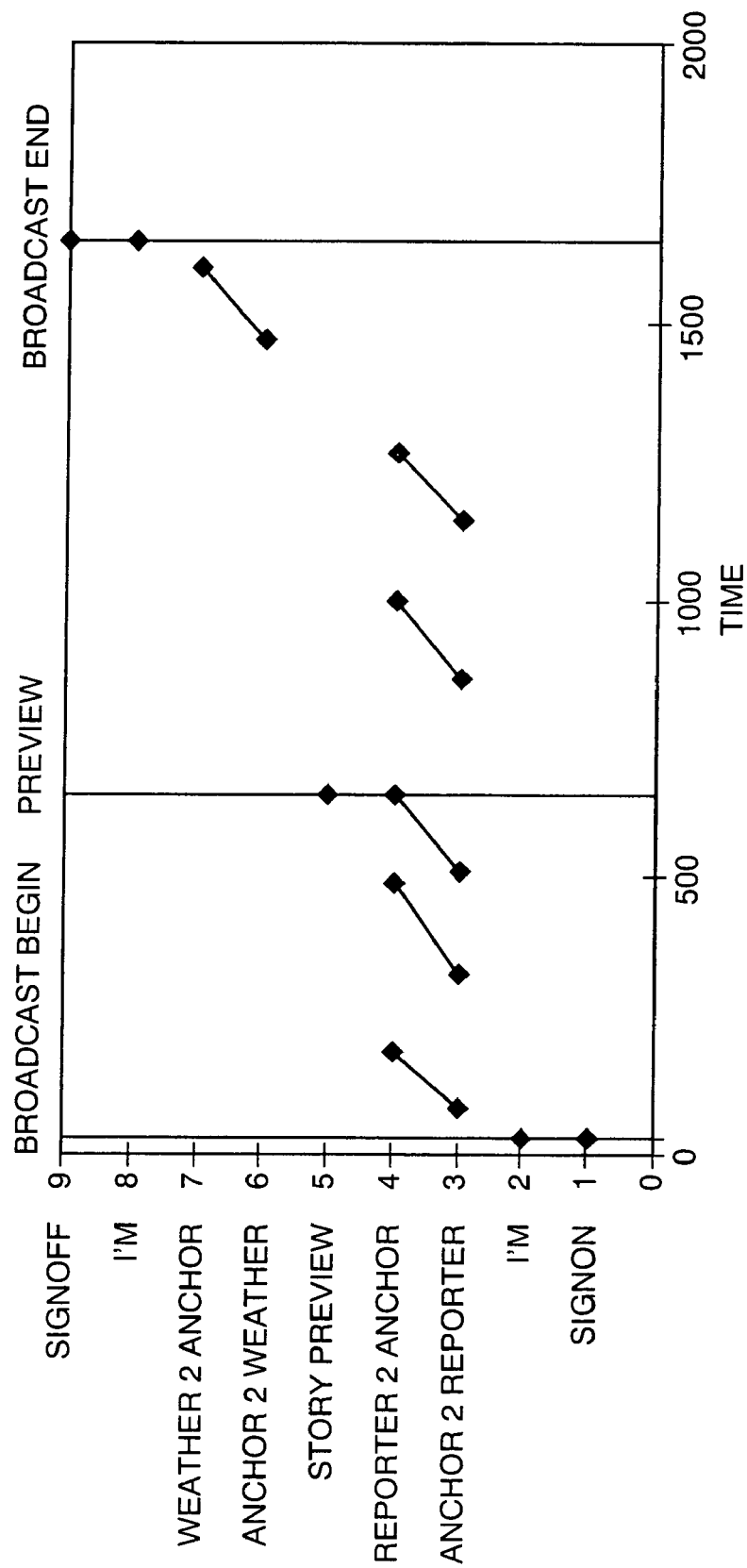
FIG. 5 is a plot of token phrases indicative of segment transitions within a particular PrimeNews broadcast.

FIG. 5 is a graphical time line view of an exemplary PrimeNews broadcast showing the occurrence of various observed event cues detected at particular times. For example, the broadcast began at about 20 seconds with the anchor saying "I'm" and then proceeded at about 200 seconds into a state where the anchor did a hand-off to a reporter. This event signaled the beginning of a first story segment (as indicated by the connected dots) that ended with the reporter handing back to the anchor at about 200 seconds. Another story was detected beginning with an anchor to reporter hand-off at about 300 seconds and at 500 seconds with a reporter to anchor. A story preview was detected at 600 seconds. Third and fourth story segments occurred from 900 to 1000 and from 1100 to 1200 seconds. A weather segment was found at 1500 to 1600 seconds, followed by a broadcast end.

In order to more fully understand how the state transitions are used in correlation 120, the details of how each information stream of the media source 102 is processed to provide broadcast event cues will now be discussed.

Text Stream 108 Event Processing

In the closed captioned text stream 108, highly frequent word patterns are used as one type of cue for news story transitions. One such pattern is in the anchor introduction. For example, anchors typically introduce themselves by stating {"I'm"} followed by {the anchor's name}. In the preferred embodiment, a text entity tagging tool 128 called Alembic, developed by MITRE Corporation, is used to detect "named entities" such as a person, location, organization, time, date, or monetary value occurring in the closed captioned text. (See Aberdeen, J., et al., "Description of the Alembic System Used for MUC-6," *Proceedings of the Sixth Message Understanding Conference*, Advanced Research Projects Agency, 6–8 (1995) for more details of Alembic; Alembic's part of speech recognizer is retrained to find named entities within broadcast news closed captioned text.)

Figure 3:
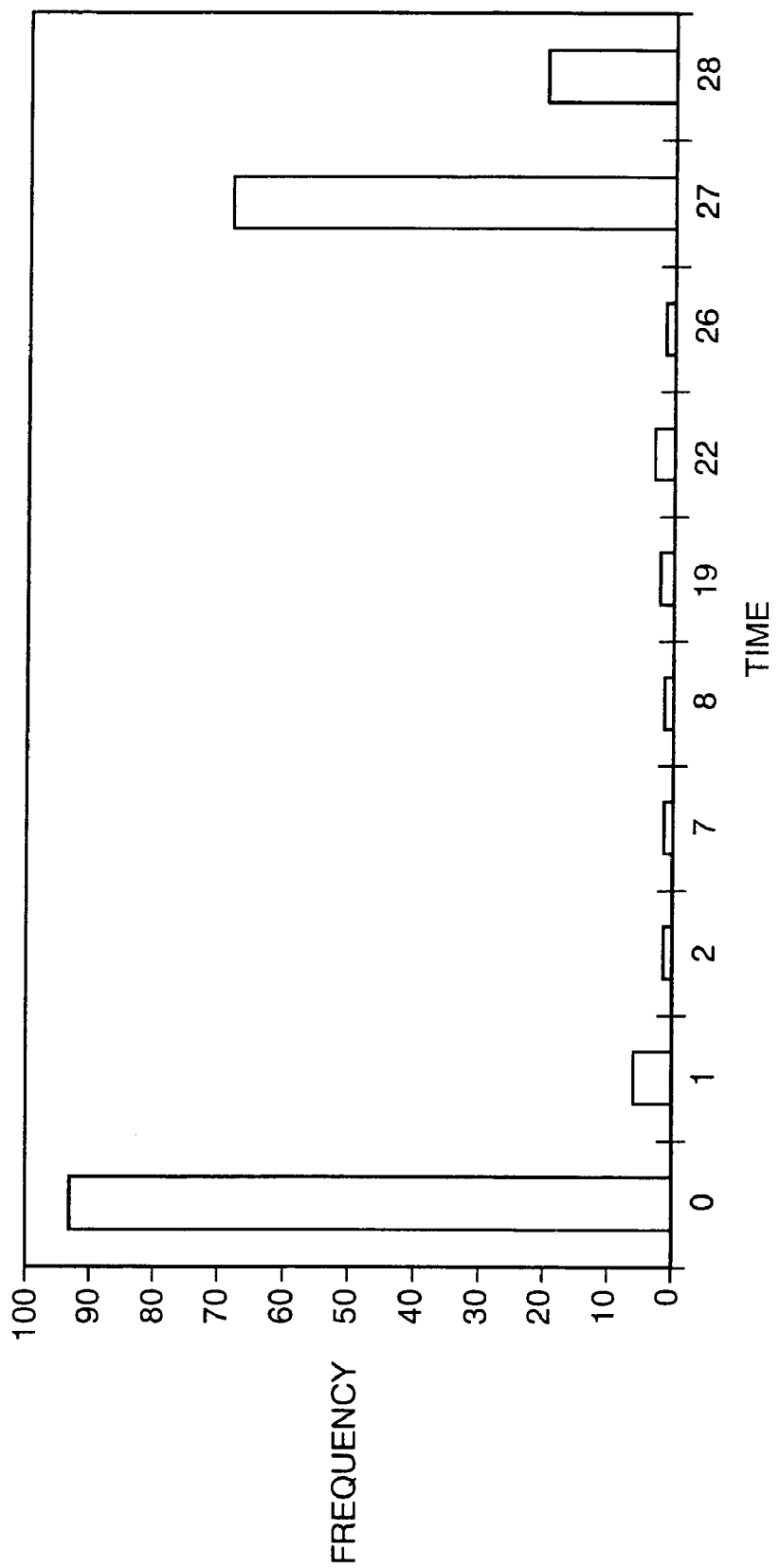
FIG. 3 is a plot of the frequency versus time for the phrase "I'm <person>" observed to occur within the closed captioned text stream of various CNN PrimeNews™ programs.

The token phrase detection process 130 is then used with the output from the named entity tagging tool 128 to perform a search for the phrase pattern {"I'm" <Person>}. As seen in FIG. 3, the token detector 130 may exploit the fact that anchor introductions typically occur 30 to 45 seconds from the start of PrimeNews and at 10 to 20 seconds from the end of the program. Detection of the token phrase {"I'm <Person>"} is thus a reliable predictor of start of broadcast and end of broadcast events.

From an analysis of word frequencies and their temporal locations in PrimeNews, it is possible to identify other introductory phrases that occur in other contexts. A specific list of these other terms is listed in Table 1. Observed phrase frequency data for such other terms, similar to that of FIG. 3, can be used to develop a set of token phrases used as other indicators of the "Start of Broadcast" state.

I'M <PERSON>
    HELLO AND WELCOME
    HELLO FROM <PLACE>
    WELCOME TO
    THANKS FOR WATCHING
    THANKS FOR JOINING US
    HERE ON PRIMENEWS
    TONIGHT ON PRIMENEWS
    PRIMENEWS

Table 1. Introductory CNN PrimeNews™ Anchor Token Phrases

Figure 4:
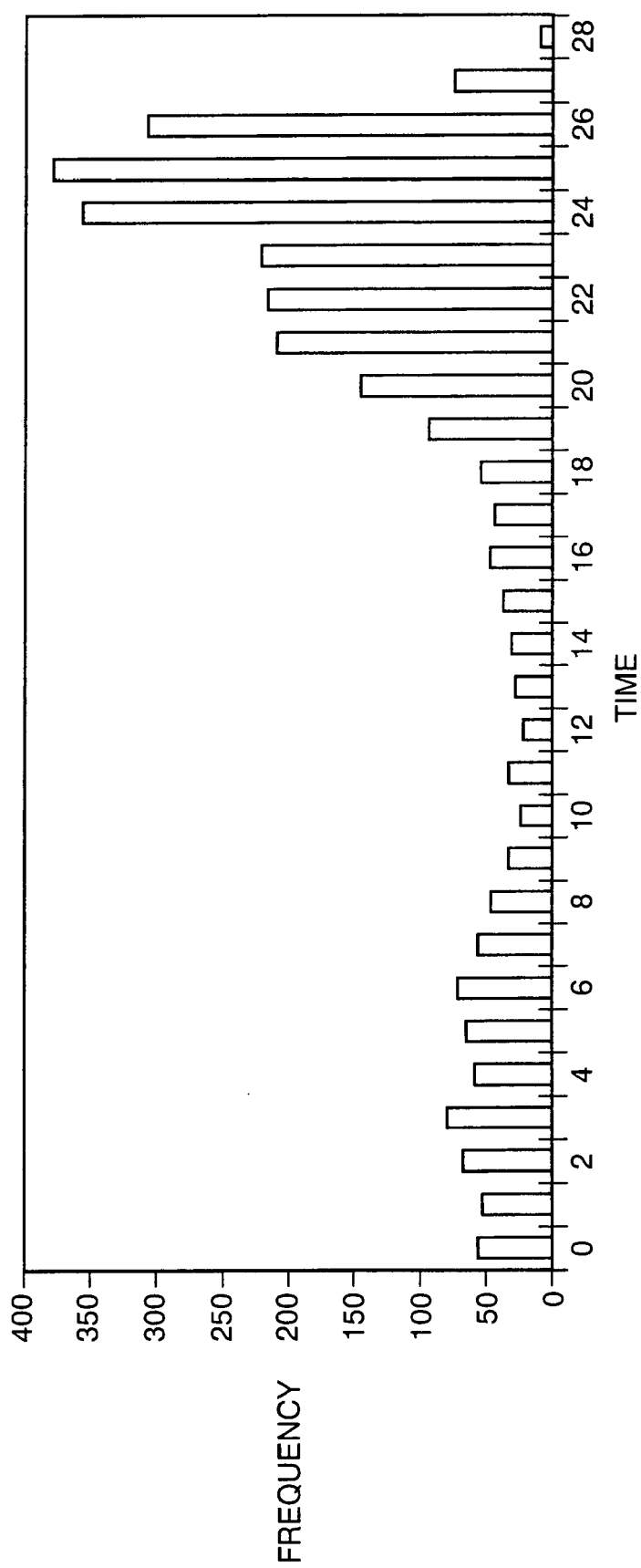
FIG. 4 is a plot of the frequency of weather terms within a PrimeNews text stream.

Other token phrases are then used in a similar fashion to detect still other broadcast states, such as by having the token detector programmed to identify terms that identify the type of segment. For example, certain terms nearly always occur during story segments pertaining to the weather. A list of such weather terms is in Table 2. From a plot of expected term frequency versus time statistics for these terms, such as shown in FIG. 4, it can be seen that a weather report starts on average 22 minutes and 30 seconds from the start of the broadcast and ends on average 2 minutes and 45 seconds later. Using this information, a story is tagged as a weather segment if it falls within these time periods and uses the listed terms.

WEATHER
    FORECAST
    FRONTAL SYSTEM
    LOW PRESSURE
    HIGH PRESSURE
    RAIN
    SNOW
    ICE
    HAIL
    STORM
    CLOUD
    PRECIPITATION
    TORNADO
    HURRICANE
    LIGHTNING
    THUNDER

Table 2. Weather Story Segment Token Phrases

Story segment cues can also be detected by considering anchor to reporter and reporter to anchor hand-offs. For anchor to reporter detections, the phrases illustrated in Table 3 may be used where the identification of a person or location is first made by the named entity tagging tool 128. For reporter to anchor hand-off detections, the phrases illustrated in Table 4 may be used, where again the person and location named entities are first tagged.

TABLE 3

Anchor to Reporter Hand-off Token Phrases

<varying phrase> "CNN's" <Person>
    (e.g., "HERE'S CNN'S GARY TUCHMAN")
<Person> "JOINS US"
    (e.g., WHITE HOUSE CORRESPONDENT WOLF BLITZER JOINS US")
<Person> "REPORTS"
    (e.g., "CNN'S JOHN HOLLIMAN REPORTS")

TABLE 4

Reporter to Anchor Hand-Off Token Phrases

<Person> "CNN," <Location>
    (e.g., "BRENT SADLER, CNN, GAZA")
"BACK TO YOU"
    (e.g., "BACK TO YOU IN ATLANTA")
"THANK YOU" <Person>
    (e.g., "THANK YOU, MARTIN")

There are also instances in a PrimeNews program when the anchor or reporter gives highlights of upcoming news stories. These "teasers" can be found by the token phrase detector 130 looking for the phrases found in Table 5.

COMING UP ON PRIMENEWS
    NEXT ON PRIMENEWS
    AHEAD ON PRIMENEWS
    WHEN PRIMENEWS RETURNS
    ALSO AHEAD

Table 5. Story Preview Token Phrases

Certain "anchor booth" phrases also provide a detection cue for the End of Broadcast state. As seen in Table 6, these phrases are mostly sign off phrases, and are observed at the end of 97% of PrimeNews programs.

THAT WRAPS UP
    THAT IS ALL
    THAT'S ALL
    THAT'S PRIMENEWS
    THANKS FOR WATCHING
    THANKS FOR JOINING US

Table 6. End of Broadcast Token Phrases

The closed captioned stream 108 provides other cues to story structure as well. For example, the closed captioned operator frequently inserts punctuation cues to delineate events. The more useful cues are:

| | |
|---|---|
| ">>" | indicates that the primary speaker has changed |
| ">>>" | indicates that a topic shift has occurred |
| <Person>: | (e.g., "Linden:") indicates who is speaking. |

The closed captioned punctuation cues are supplementary information entered by the closed captioned operators as they transcribe speech to closed captioned text as an aid to viewers. Most notable is the ">>" cue used to indicate a change in speaker and ">>>" cue used to indicate a change in story. When available, the closed captioned operator cues are a valuable source of information; however, their use by closed captioned operators is not standard and thus relying upon them alone may lead to errors. For example, while most broadcast news sources provide the speaker change indicator, the story change indicators are present for some sources. Moreover, operators also can make errors (of omission, substitution, and insertion), which further reduce the reliability of closed captioned stories.

It is important to note that the segmentation process described above for closed captioned text can also be applied to multimedia sources (e.g., television, radio, surveillance video, and amateur video) that do not have supporting closed captioned data. After speech-to-text processing, the resulting text stream can be analyzed for both structural and discourse cues, of course subject to transcription errors. Speech transcription errors are lower for certain types of segments, for example, anchor booth segments, which also enables application of speech transcription selectively, based on the type of segment.

Audio Stream 106 Event Processing

Figure 6:
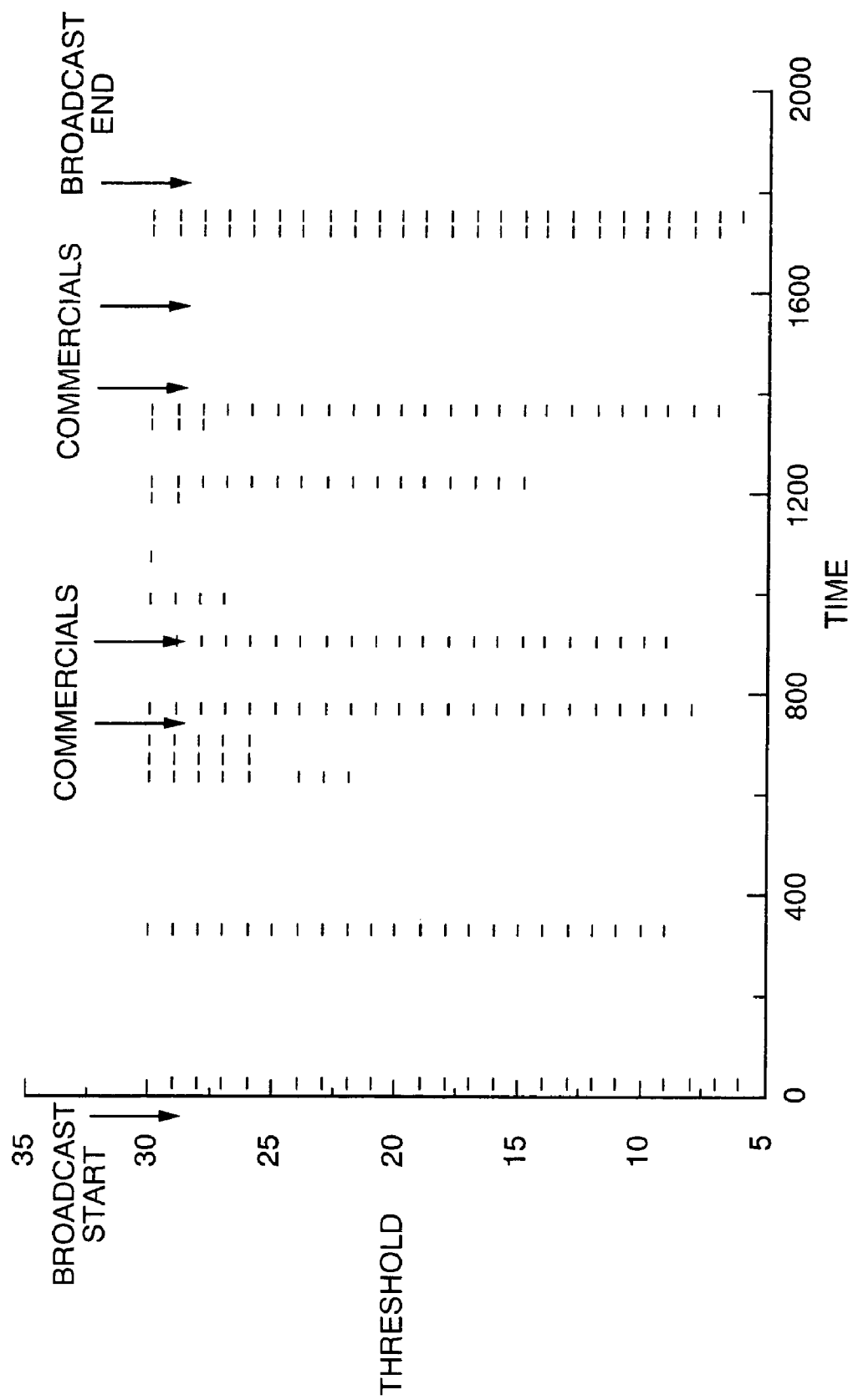
FIG. 6 is a plot of silence detection events within an audio stream based on certain energy levels.

The silence detection process 114 as was described above analyzes the audio stream 106 for sample periods of silence of a predetermined length, such as at least 0.7 seconds. Sample periods for which the audio signal level does not exceed an energy threshold are then flagged as a silence event. Although there may be various reasons for periods of silence, the knowledge of these data points is useful. For example, as shown in FIG. 6, when these events are plotted over time, they can serve as additional information as to when story segments or commercials begin and end.

The audio stream 106 is also processed using speaker change detection 116 software that identifies a speaker change event when the speaker-dependent components of the audio signal change more than a predetermined amount.

Video Stream 104 Event Processing

The frame classification 112 process discovers the location of black frames, logos, single anchor (i.e., one anchor is visible), and double anchor (i.e., two anchors are visible) scenes from the input imagery 104. Black frames are used to detect commercials, and logos are used to detect the beginning and end of a broadcast. Single and double anchor booth frame recognitions aid in locating story segment boundaries.

Figure 7:
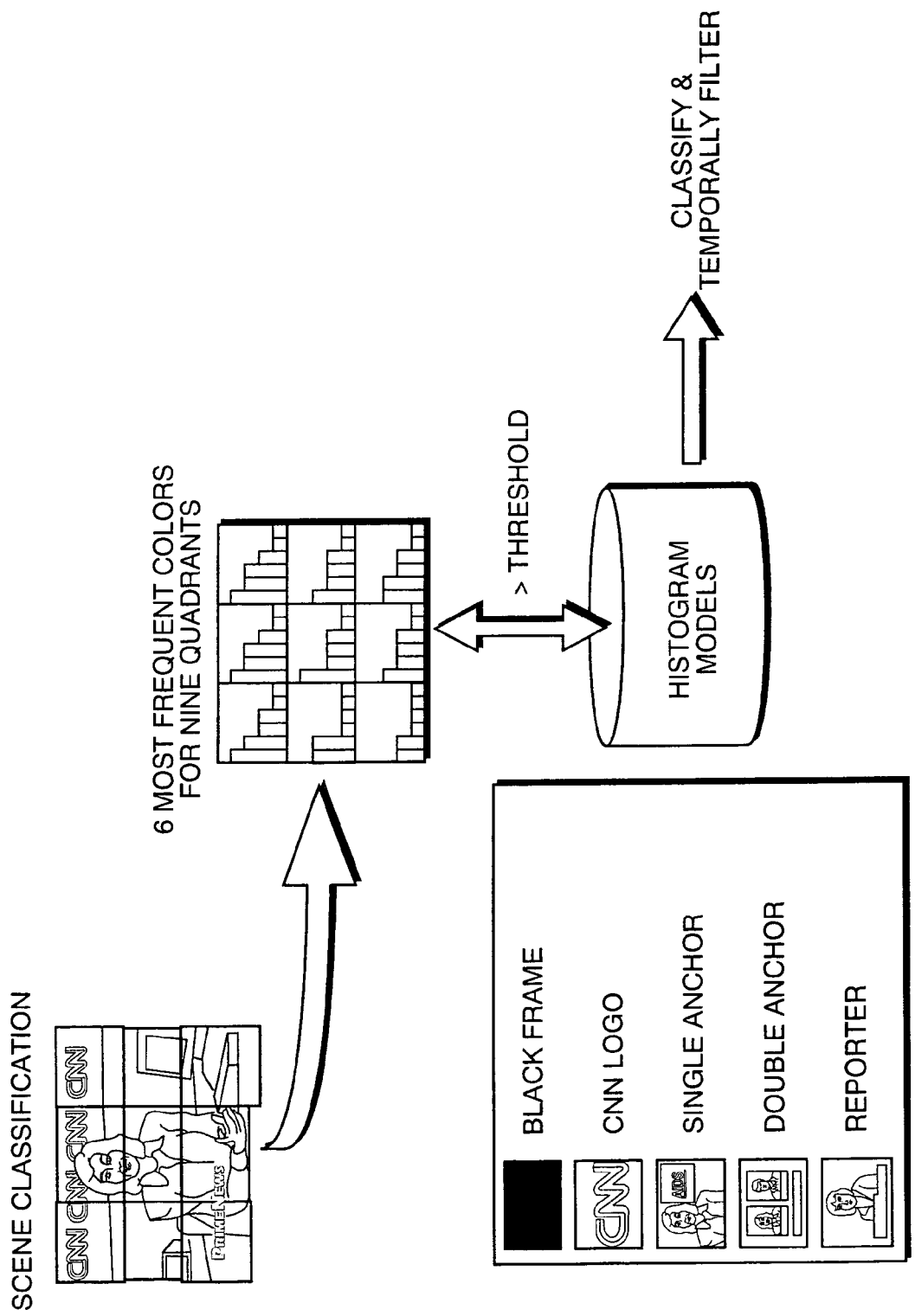
FIG. 7 is a diagram of a scene classification process.

FIG. 7 illustrates the preferred process used by scene classification 112. A histogram of the colors of pixels is created for each frame to develop structures for the six most frequent colors in the nine "quadrants" of the frame (e.g., upper left, upper middle, upper right, center left, center middle, center right, lower left, lower middle, lower right).

The histogram for a frame is then matched against models for each frame type such as black frame, CNN logo, single anchor, double anchor, and reporter frames. If a sufficient level of match is detected, the frame is classified accordingly.

Figure 8:
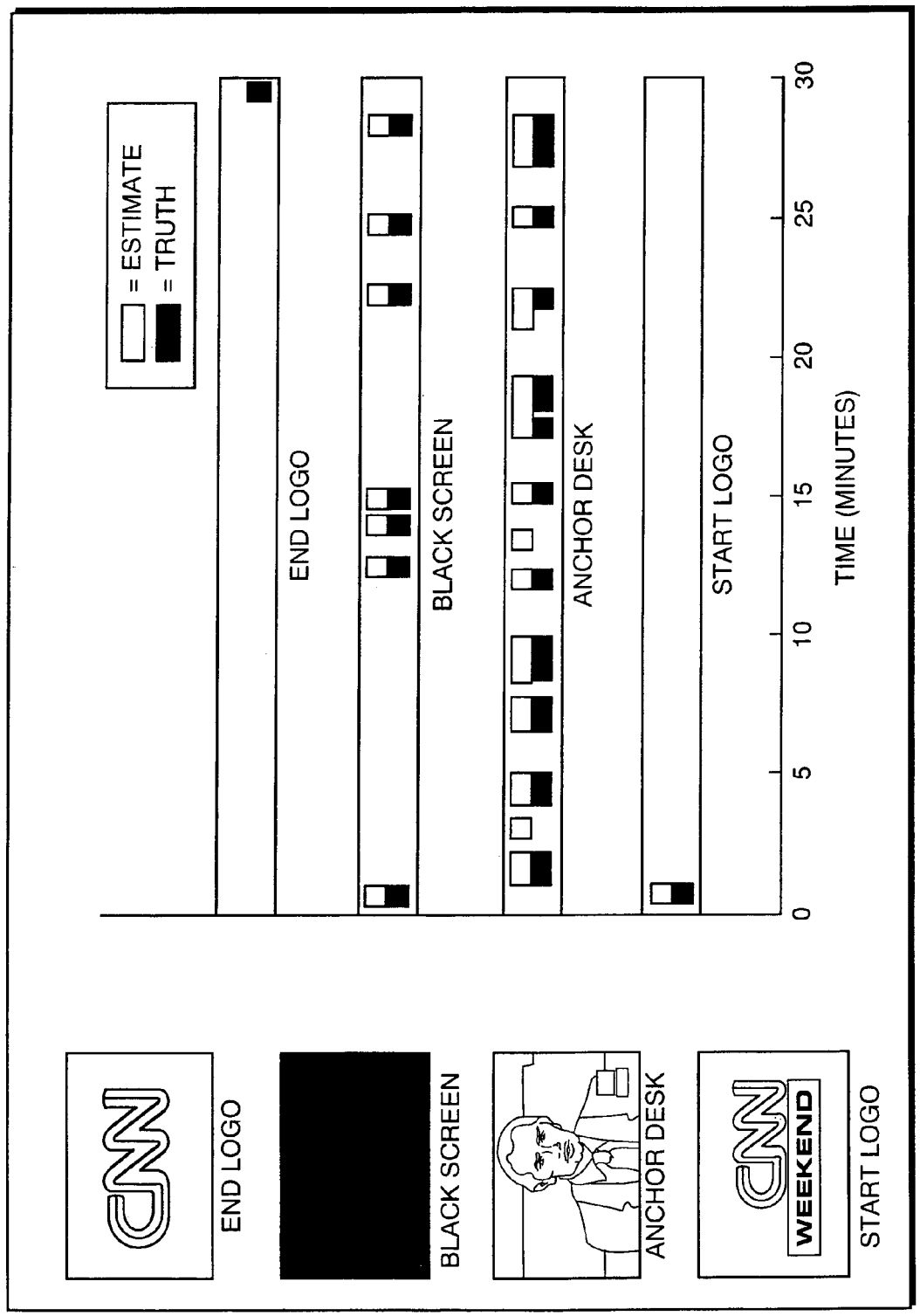
FIG. 8 is a plot of classes of image frames versus time of occurrence.

As shown in FIG. 8, a plot of detected video frame class versus time is also indicative of story segment begin and end, although not perfect, as indicated by the presence of white boxes (estimated events) versus corresponding actual (truth) events.

Multi-Stream Event Correlation 120

An examination of FIGS. 3 through 8 indicate that cues from any one stream are indicative, but not infallible, indicators of the beginning and ending of story segments. News story boundaries are thus more reliably detected by correlating the processing of each of the cues discussed above. In general, broadcast boundaries are found by correlating audio silence, video logo, and black frame cues along with closed captioned tokens. Commercials are primarily found by correlating audio silence, black frame, and closed captioned blank line cues. Finally, story segments are primarily found by correlating closed captioned punctuation symbols (>>>, >>, <person>:), anchor to reporter, and reporter to anchor hand off cues, although speaker change detection and scene change detection also assist in verifying their start and end.

When deciding on the preferred techniques to be used for cue correlation 120, there are two requirements. First, the technique should be flexible enough to allow the quick addition of new cues into the system. Second, the technique should be able to handle cues that are highly correlated with each other (e.g., Black Frame and Silence).

The preferred technique used herein is to implement cue correlation 120 as is a finite state automation (FSA) enhanced with time transitions. The states and transitions of the FSA are represented in a relational database. Each detected cue and token is represented by a state that is instantiated by a record in the state table. The time transition attribute of each state allows state changes based on the amount of time the FSA has been in a certain state. For example, since for a CNN PrimeNews broadcast it is known that the highlights section never lasts longer than 90 seconds, a time transition is created to move the FSA from the "Highlights" state to the "Start of Story" state whenever the FSA has been in the "Highlights" state for more than 90 seconds. The time transitions act as buffer against the possibility that no cues used to detect a transition to another state occur when the system expects them to.

A combination of black frame video, audio silence, and closed captioned operator cues allow one to identify advertising or commercial segments. The end of a sequence of commercials in the closed captioned text is indicated by a blank line followed by a line containing a change of speaker (>>) or new story (>>>) indicator. One can then search backwards to find the beginning of the sequence, which is indicated by a ">>" or ">>>", followed by any number of non-blank lines, followed by a blank line. The blank lines correspond to short (0.5 to 3 second) silences which accompany the transitions from news to commercials and back to news. Having the ability to identify and eliminate commercials also benefits proper named entity extraction and story summarization routines.

Figure 11:
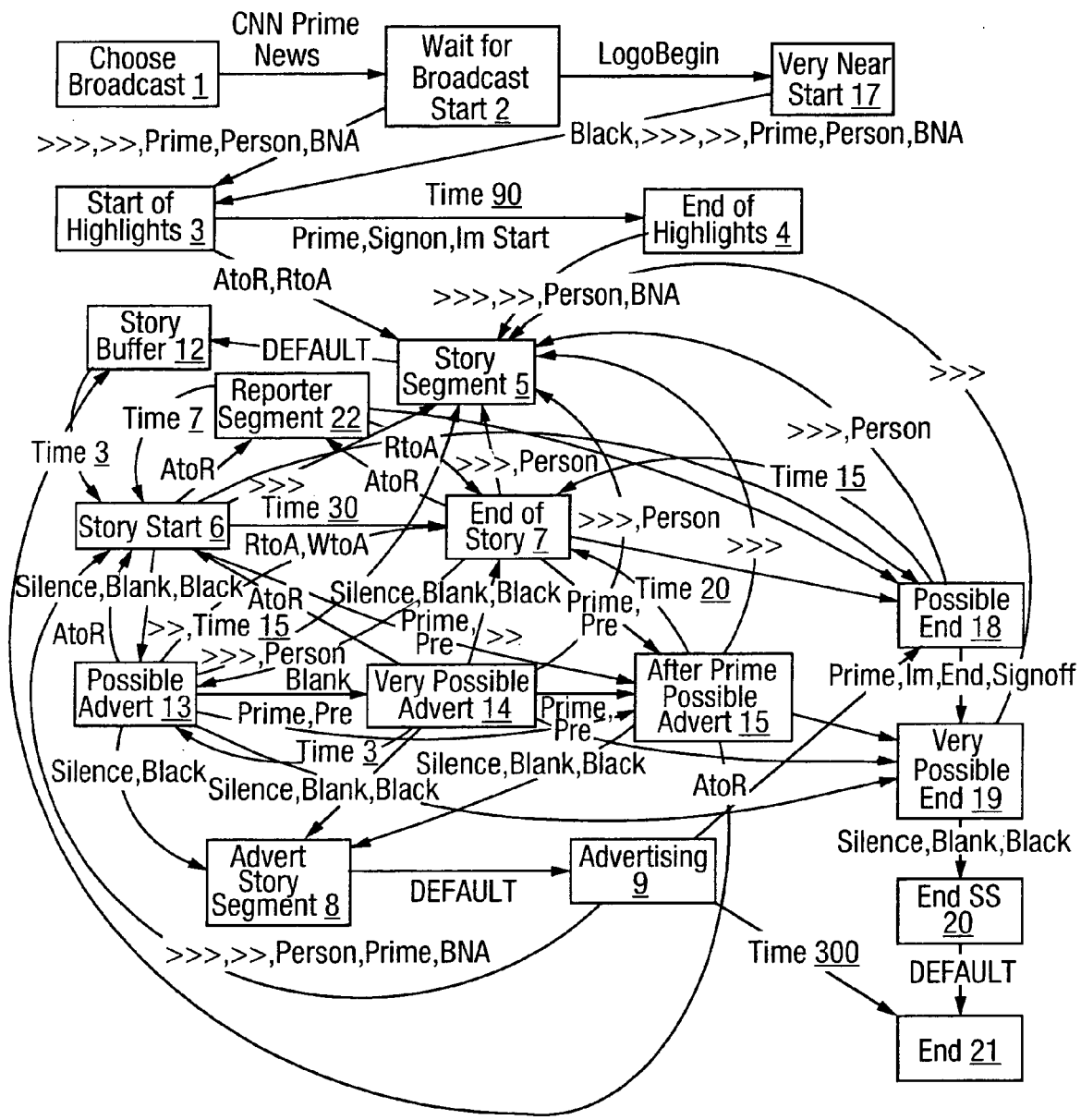

Below are listed the primary cues used to determine when the news broadcast has entered each of the primary states. An exemplary map of states and state transitions for the preferred embodiment are shown in FIG. 11 and listed in Appendices A and B. Note that any one of several events may cause a transition from one state to another.

Start_of_Broadcast. The CNN logo.

Start_of_Highlights. A Black_Frame or any closed captioned cue (>>>,>>, <person>:).

End_of_Highlights. A Sign_On cue (e.g., "Hello and Welcome"). If still in Start_of_Highlights after 90 seconds, the FSA automatically moves into this state.

Start_of_Story. A >>> (topic shift) closed captioned cue will nearly always generate a Start_of_Story state. A <person>: cue will generate a Start_of_Story if 30 seconds have elapsed or a reporter to anchor transition has occurred.

Advertising. A Black_Frame along with Silence or several blank closed captioned lines. Also, a preview cue (e.g., "Ahead on PrimeNews") followed by a Black_Frame or Silence.

End_of_Broadcast. Sign_Off cue (e.g., "That's Prime-News") followed by a Black_Frame, Silence or several blank closed captioned line cues.

The processing of other states is similar.

Figure 9:
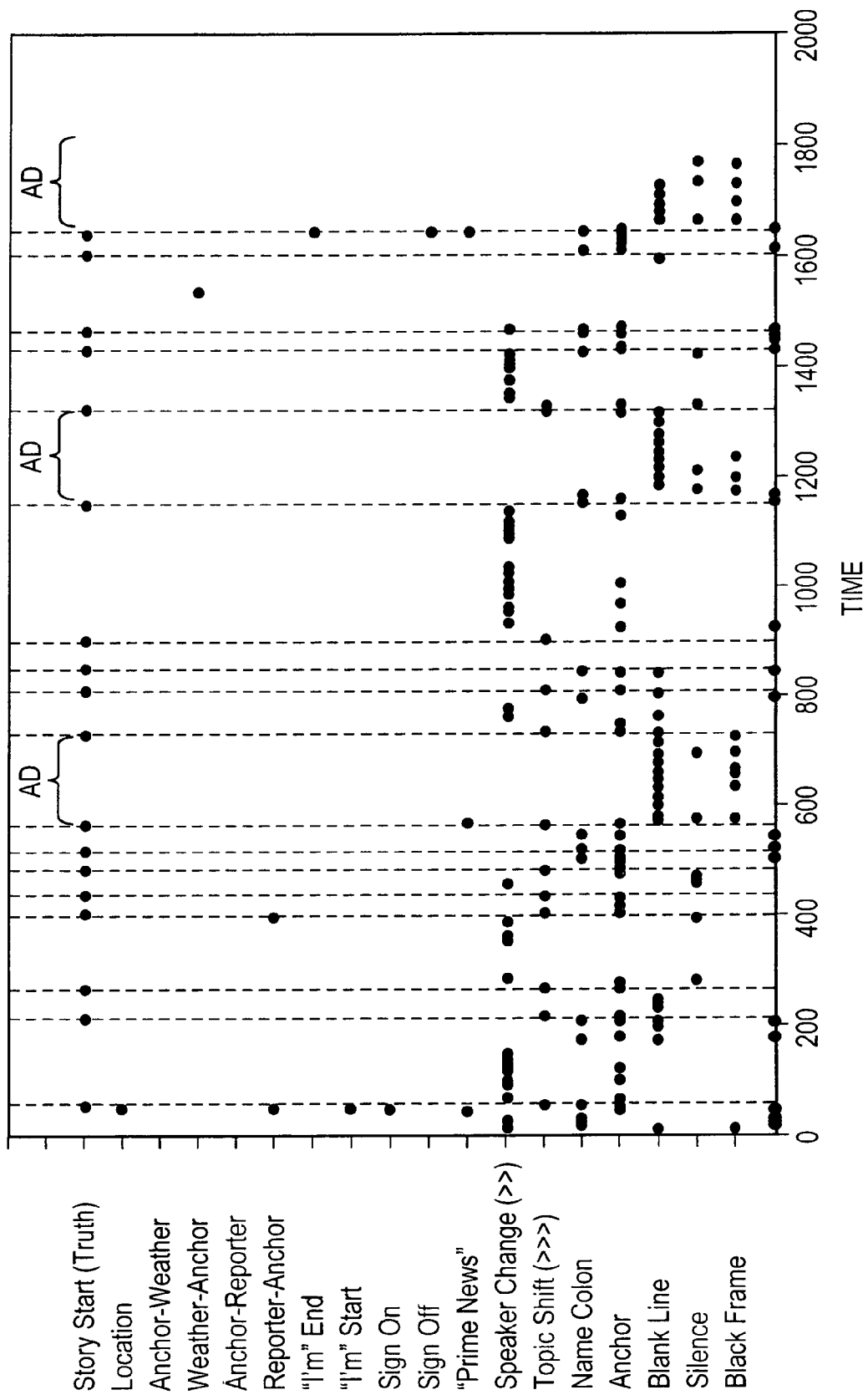
FIG. 9 is a chart showing the timing of cues in the text, audio, and video streams in a particular news program.

FIG. 9 provides a temporal visualization of cross-channel events observed in the PrimeNews broadcast of 24 Mar. 1997. The X-axis is measured in seconds from the start of the program. Human annotations (ground truth) appear in the first row of the Y-axis and include the start and end points of anchor, reporter, and commercial (ad) segments as well as inserts. An insert is a 10-second or shorter segment of supporting information (typified by a new speaker or new scene) inserted within an anchor or reporter segment. Commercials are simply indicated by a start and end point per contiguous sequence of commercials, with no annotation to indicate the start and end of each commercial nor speaker changes within commercials.

Rows two through eleven of FIG. 9 indicate the results of event detection software applied to the phrase token search of the text stream. The twelfth through seventeenth lines indicate events detected in the closed captioned channel, including speaker change and topic shift.

The remaining rows of the figure indicate scene changes of image content as derived from video frames extracted at one second intervals from the video stream. The scene changes illustrate that our image segmentor over generates. The scene change data appears to lag the other data by several seconds. This is due to the clock sequencing of the scene change detection 116 system and is corrected by a time delta.

Figure 10:
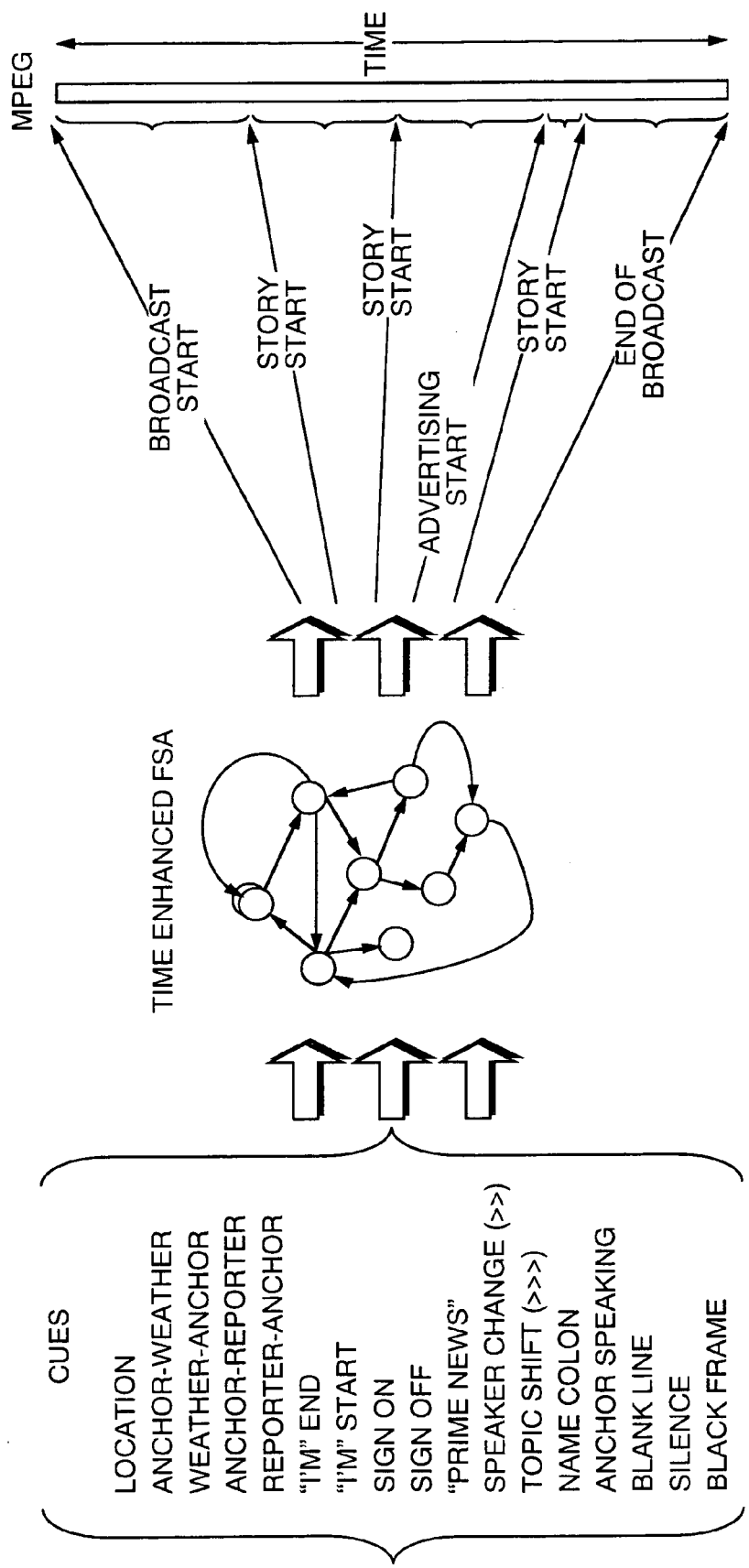
FIG. 10 is a general flow diagram of a finite state machine used to complement a story segmentation process.

FIG. 10 is a general overview of the process used by the correlator 120 to process cues from multiple streams to detect these story and advertising segments. The structuring of a finite state machine for other broadcast news programs is similar. For example, in ABC World News Tonight, a structural analysis shows that broadcasts always start and end with the anchor, each reporter segment is preceded by an introductory anchor segment and together they form a single story, and commercials serve as story boundaries. In MacNeil-Lehrer, the structure provides not only segmentation information but also content information for each segment. The series of segments is consistently a preview of major stories of the day or in the broadcast program sponsor messages, followed by a summary of the day's news (only partial overlap with major stories), four to six major stories, recap summary of the day's news, and closing with sponsor messages.

A detailed depiction of a finite state autonoma for implementing correlation 120 is depicted in FIGS. 11 and 12. A detailed description of each state transition is contained in Appendix A.

The processes described so far principally address the first stage in the above model of the summarization processes, namely analysis 210. The second and third stages in the process, selection 220 and condensation 230, address the problem of determining which elements within the text, speech, and imagery should be extracted as relevant. For example, it is possible to identify a summary of the major stories in the broadcast and a representation of the major stories themselves. A user wishing to browse a one-hour newscast therefore needs only review an opening summary and a preview of the major stories. Similarly, the need to review sponsor messages can be eliminated entirely.

Once the individual news stories have been identified, a story classifier 133 such as the ConText engine available from Oracle Corporation is used to identify a gist or theme for each story. The gist portion of ConText automatically consolidates large volumes of text, such as provided by the closed captioned stream 108 or converted audio stream 106 into a relevant summary, using Boolean logic and statistical calculation methods. Themes are also generated by ConText that can provide up to sixteen main topics for a given story.

The story summarization function 132 may also implement several heuristics for text summarization. The first is simply to pick the first N words from the text stream in a segment, assuming that the text was created in journalistic style. Since the named entity tagging 128 also extracts proper names out of the text, however, another strategy is to use the most frequently occurring named entity within each segment to serve as its label. Yet another particularly effective strategy is to select a sentence which contains the highest number of distinct named entities, selecting that sentence closest to the top of the story if there is a tie.

Along with each story, a representative key video frame can also automatically selected by the key frame selector 134, as described above.

Figure 13:
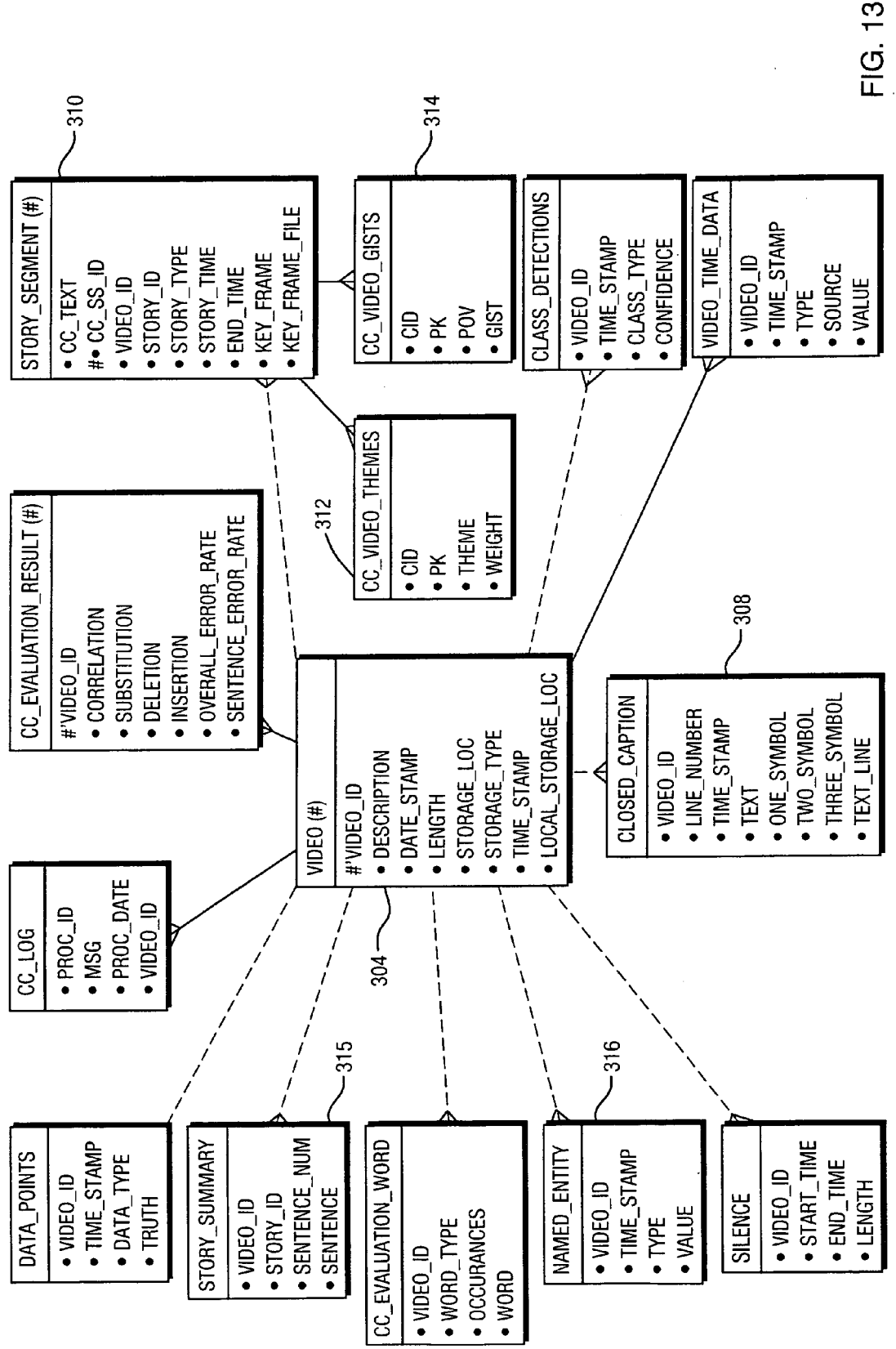
FIG. 13 is a logical diagram of database schema used to store story segments, themes, named entities, lists, and other multimedia data elements derived from a segmented broadcast.

The operation of the Broadcast News Editor 100 therefore results in various data elements being stored in the relational data base management system 140 as data files 142, as shown in FIG. 13. The database system 140 and video server 142 may be any relational database system and associated video server, for example, Oracle Relational Database Management System 7.3 with Oracle Video Server 2.1. Queries may be made through Oracle 2.0 Web Server. Within the data base system 140, a digitized source video file 304 and closed captioned text file 308 correspond to stored versions of the media source 102 and closed captioned text 108 streams. In addition, multiple story segment records 310, video theme records 312, video gist records 314, story summary records 315, and named entity records 316 result. Links are provided between the various records and the story segment to which they pertain, either directly or indirectly, to permit retrieval of related data.

C. Broadcast News Navigator (BNN)

The Broadcast News Navigator 200 enables a user to search and browse the meta data files 142 via a computer network. The user may do so through a graphical interface using a Web browser such as Netscape Communicator™, Microsoft Explorer™, or NCSA Mosaic™. (Netscape Communicator is a trademark of Netscape Communications Corporation, Microsoft Explorer is a trademark of Microsoft Corporation, and Mosaic is a trademark of The Board of Trustees of the University of Illinois.) The graphical interface is provided by creating Hypertext Markup Language (HTML) page files and/or Java applets that access the meta data 142 in a manner that is well known in the art.

Figure 14:
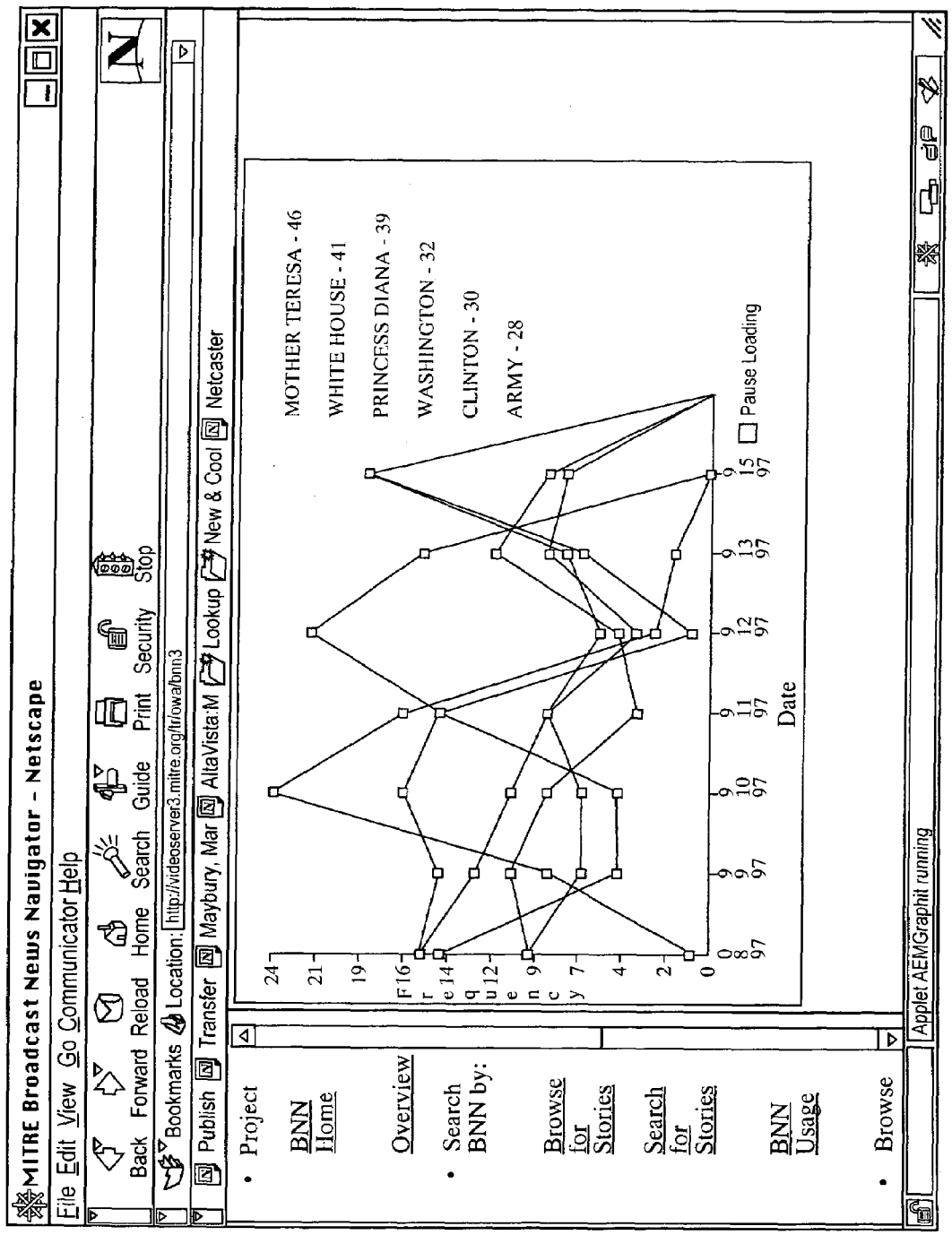
FIG. 14 is one view of a Web page showing data extracted and formatted to permit visualization of trends in usage of named entities.

For example, one quite useful initial query is to search for the most popular named entities in news stories that have occurred in the last week. FIG. 14 illustrates one such response to this query, which is a plot of the frequency of named entities versus date. Notice that the plot shows there were many references to the named entities "MOTHER THERESA", "WHITE HOUSE", and "PRINCESS DIANA" during the week of 8 Sep. 1997. From this display, the user may then determine what the most frequent news stories were about during that time period.

The graphing program can also be arranged to continually graph new tags at preset time intervals, for example, 30 seconds. Once the user has found a tag of interest, the user simply clicks on the data point to view the related stories.

Within Broadcast News Navigator 200, a user may also specify particular broadcast news agencies and time periods they are interested in searching via a graphical interface as shown in FIG. 15. The system 10 will then generate a list of stories from broadcasts during these dates in reverse chronological order.

Figure 16:
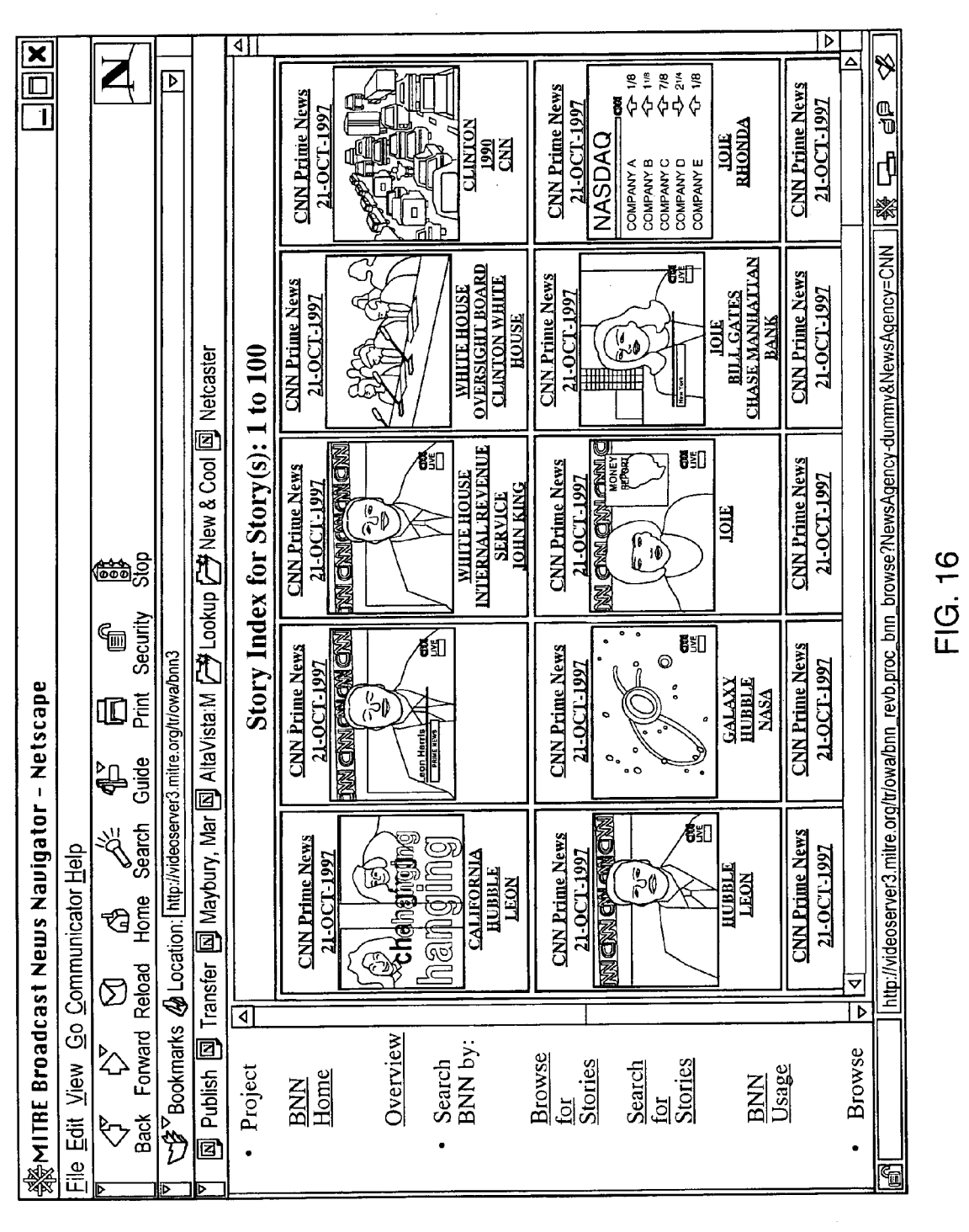

The returned stories are viewable in a thumbnail sketch of a given news broadcast such as depicted in FIG. 16, such as when the query is limited to a particular broadcast program, for example, Oct. 21, 1997, sorted in descending order of temporal occurrence. Each returned story contains a key frame, the date, the source, the three most frequent named entity tags, and links to story details.

Figure 17:

FIG. 17 is an example of a similar thumbnail view returned for a named entity search for the word "Pentagon."

Figure 20:
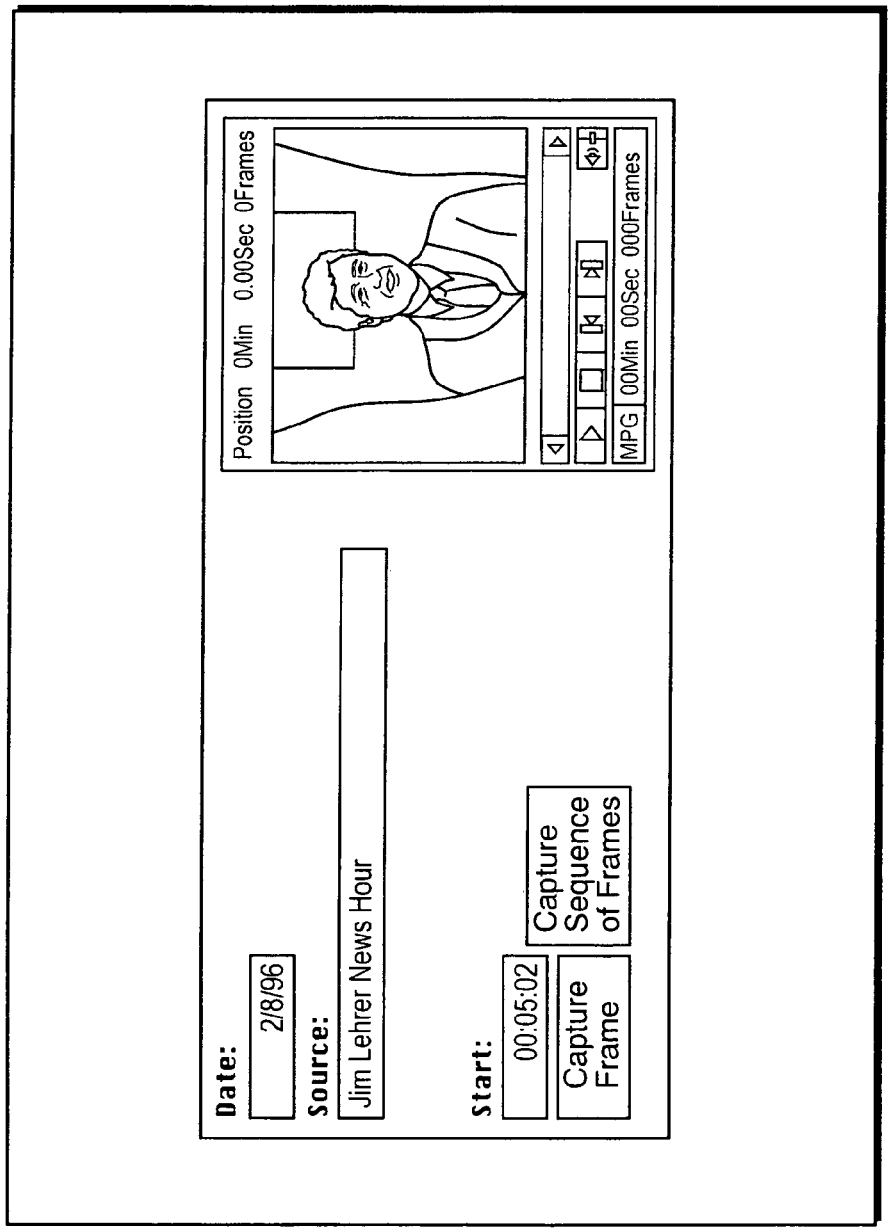
FIG. 20 is a view of a video segment replay page.

By clicking on one of the key frames, the system 10 retrieves the stored files and accesses just the selected segment for playback. While viewing the video clip, such as shown in FIG. 20, the user has the ability to directly access the portion related to the story segment. Thus, if the story segment starts at six minutes and twelve seconds into the news broadcast, the streaming of the video to the user will start at that point.

Figure 18:
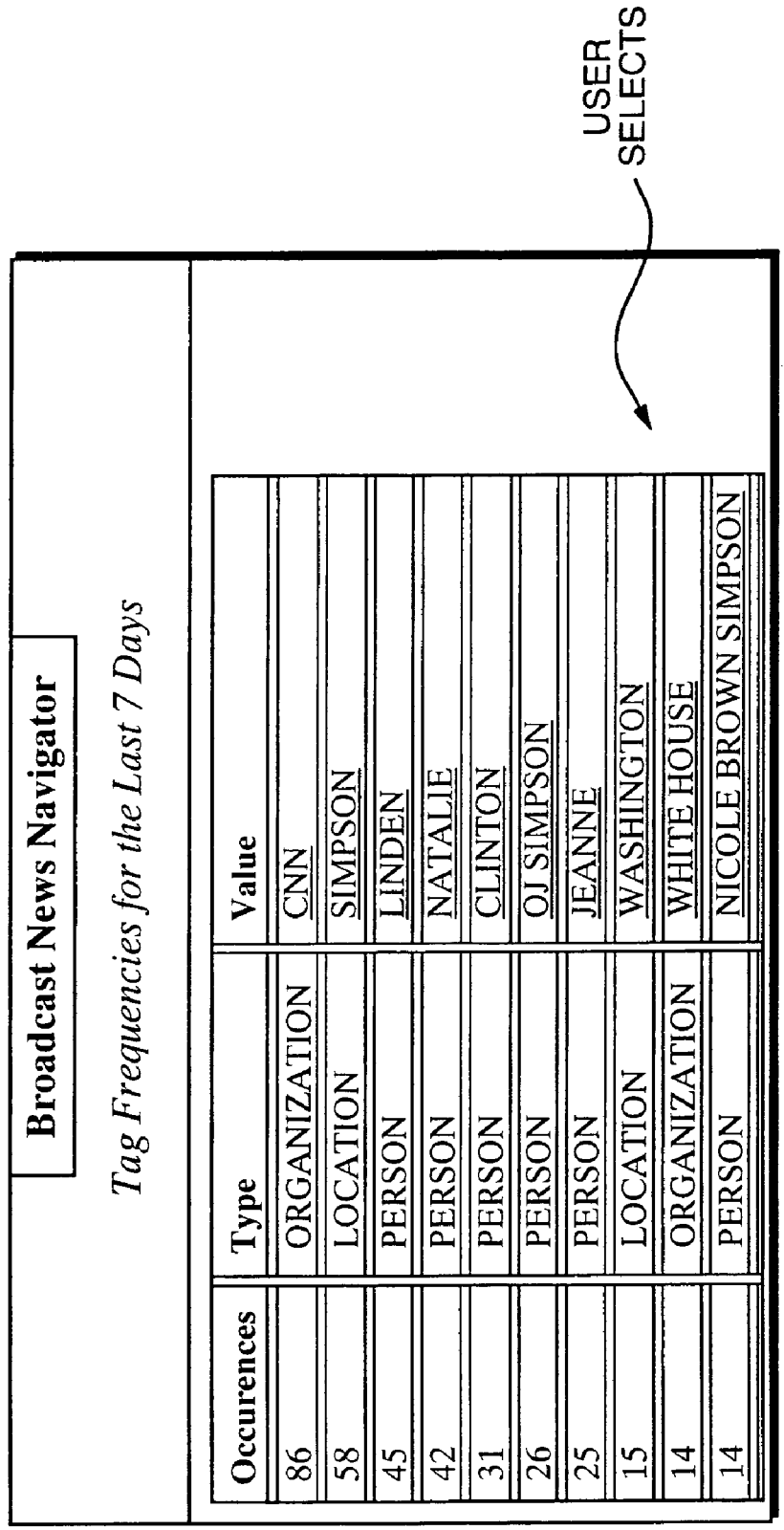
FIG. 18 is a view of a topic, person, organization, or location named entity frequency page.

The navigation tool 200 also gives the user the ability to view results by the frequency of detected topic, named person, named organization, or named location tag as shown in FIG. 18. The user may then select a named entity to then view a thumbnail, such as in FIG. 17, of the results.

Figure 19:
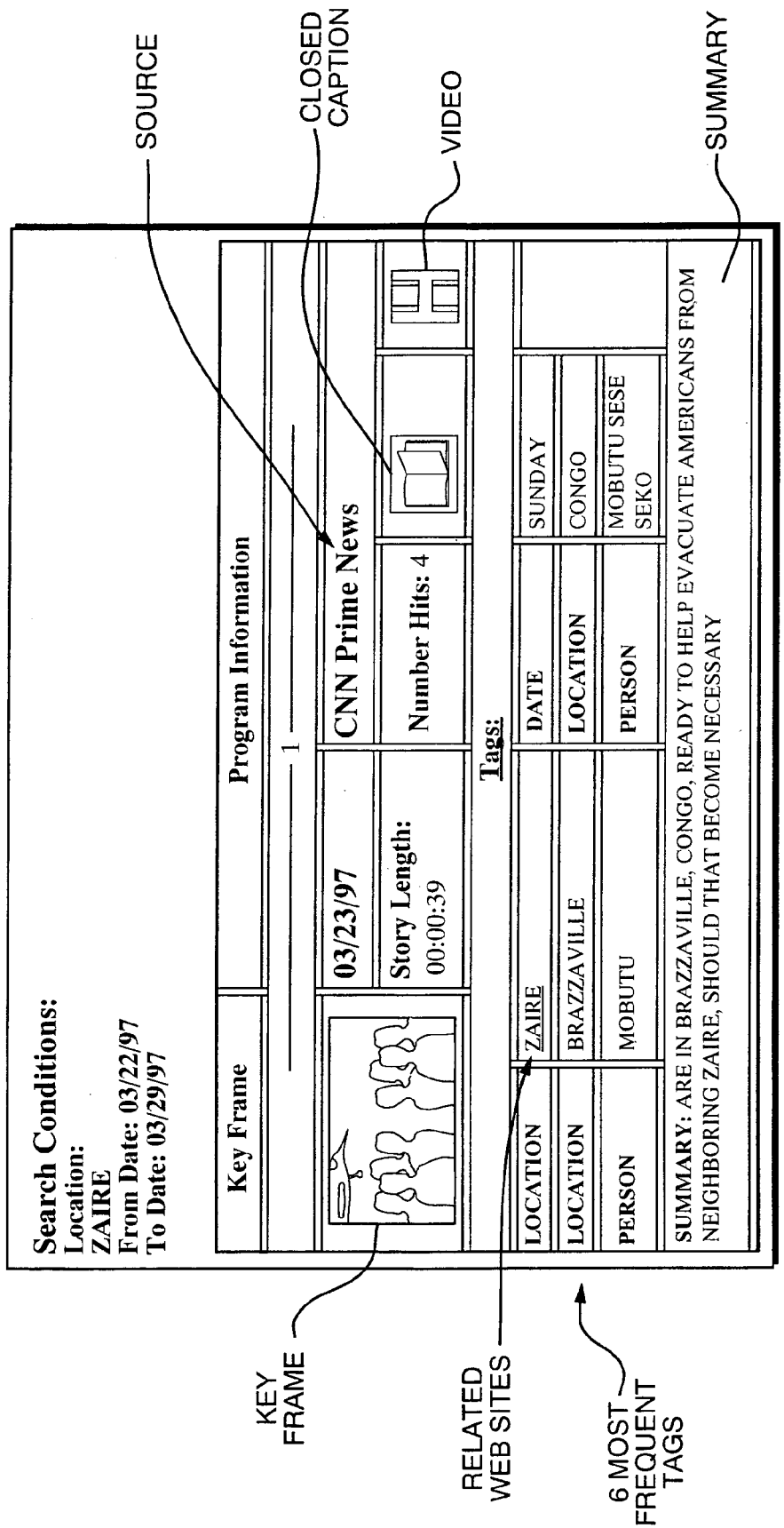
FIG. 19 is a view of a multimedia summary Web page.

FIG. 19 illustrates a standard story summary form, including a story summary and the closed captioned text, video, or all of the tags found for the story. This is returned to a user after formulating and executing a keyword search (including boolean operators), named entity query (e.g., "find me recent stories on Clinton"), or named entity frequency plot. The summary form includes the source, duration, date, a key frame, and a sentence summary of a retrieved story segment. Several links in the display enable the user to retrieve the full video, text, or extracted entities (tags) associated with each story.

In order to create this summary, a key frame is selected from the story segment as previously described. A more sophisticated image extraction algorithm may exploit camera movement and also more informative imagery, such as "visual subtext" on the screen identifying the speaker and/or topic (i.e., a visual caption).

Within a story segment, matching extracted named entities are aggregated and the six most frequently occurring names, organizations, and locations identified within the story segment are selected to include in the summary. Next, the first sentence in the segment is selected as a key sentence. Alternatively, a more sophisticated text selection algorithm which exploits term frequency/inverse document frequency, extracted entities, and a more sophisticated semantic and relational analysis is used to discover key phrases and utterances within a string. As FIG. 19 illustrates, the result is that for each story, the user obtains a key frame, the date, the source, the most frequently occurring named entities, a single line summary of the story, and pointers to view the closed captioned text or video for the story, as in FIG. 20.

Figure 21:
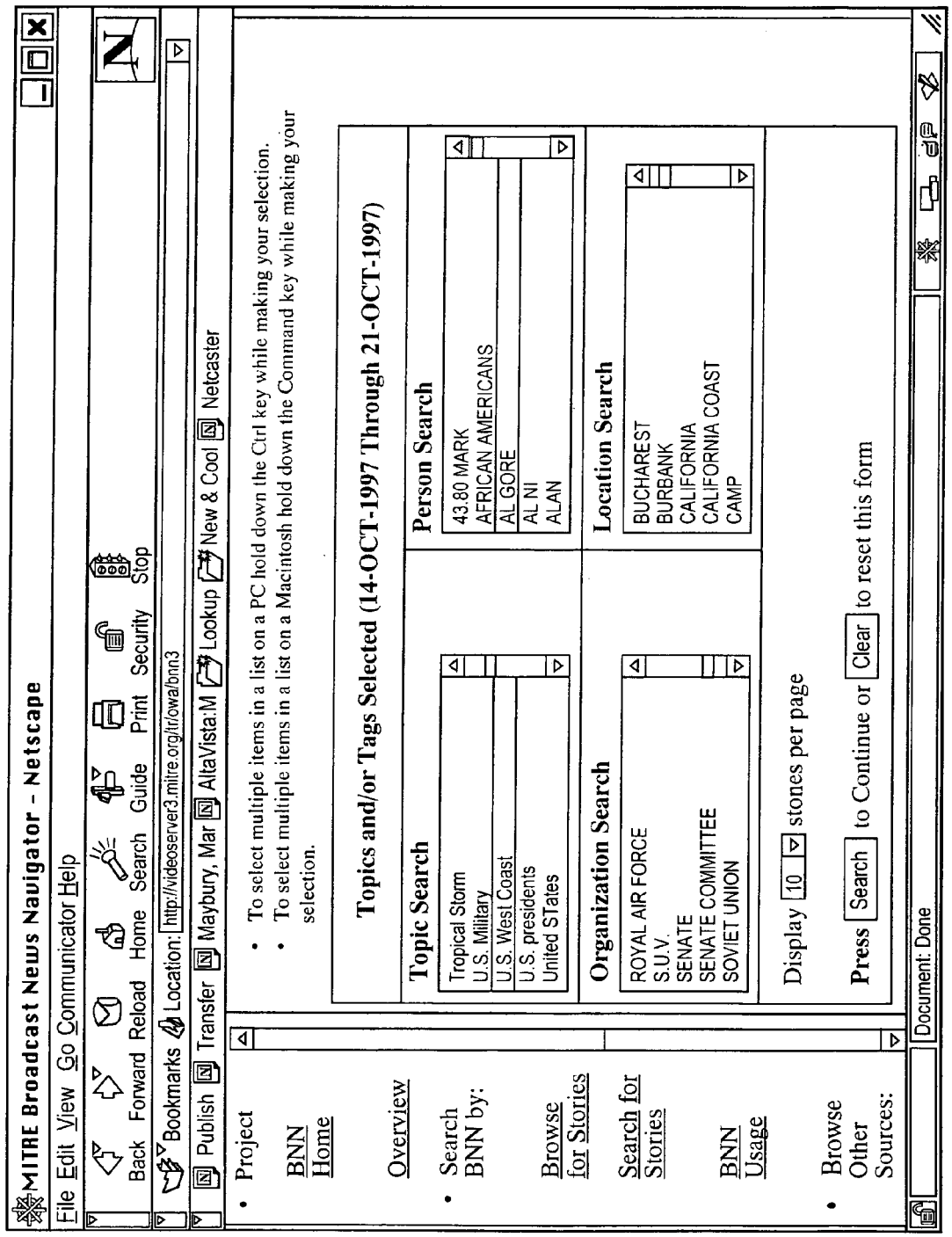
FIGS. 21 and 22 are still other search query pages.
Figure 22:
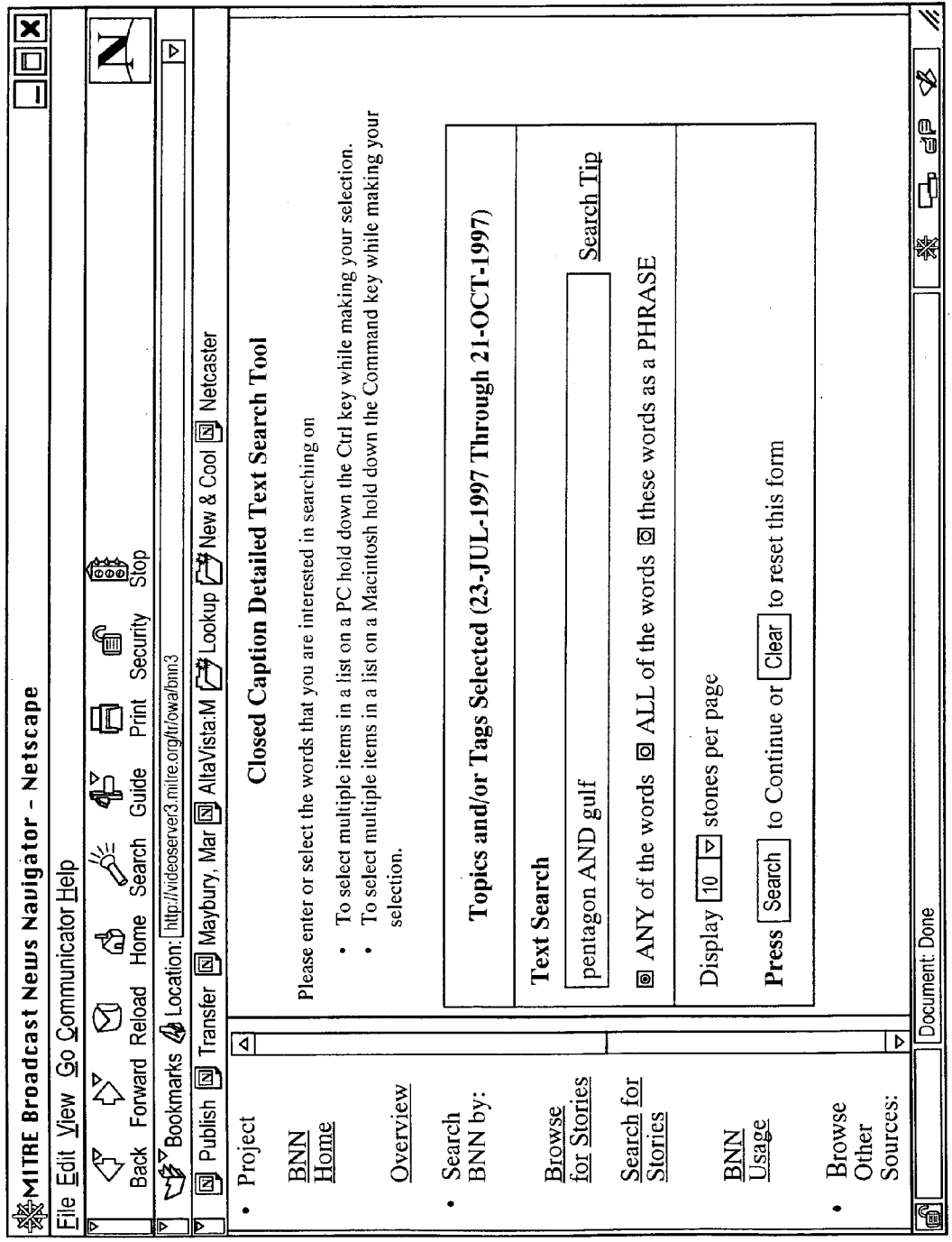

A search tool may be used to search by named entity, such as by topic, organization, person, or location, as shown in FIG. 21. Other search query forms are possible, such as shown in FIG. 22, which is a search of the closed captioned text records. Either of these types of search queries can result in displays such as FIG. 17 or FIG. 18.

A program summary, as in FIG. 16, consisting of multiple story frames, can also serve to function as a top level, hierarchical, video table of contents.

It is also possible to provide a more tailored presentation, for example, searching for people, show only person named entities and key frames that include faces. Several alternative selection strategies can thus result in different summary views.

A program summary, as in FIG. 16, consisting of multiple story frames, can also serve to function as a top level, hierarchical, video table of contents. This results in a "story board" of a broadcast, such as in FIG. 16, with one key frame representing each story, although given the limited key frame extraction algorithm, this may result in under coverage of the visually salient content.

In contrast to this entirely visual summarization/presentation of the data, it is also possible to present an entirely text centric perspective. It is also possible to further connect these various levels of abstraction of the underlying story to start with a broadcast news program table of contents (a key frame associated with a headline) and allow the user to "drill down," obtaining increasing levels of detail in each media (key phrase to key sentence to full text, keyframe to keyclip to full segment, sound bite to full audio), ultimately providing the entire source.

Efficacy of Story Segmentation

Breaking a news broadcast into reported news stories provides effective browsing that requires the data analyst to review less material than through linear browsing unsegmented content. To demonstrate the efficiency of a story segment search, metrics were gathered in a task based retrieval experiment.

To search for a particular news story in a given program, a linear search was first performed in a sequential fashion throughout recorded video tapes until the story was found. This is obviously a time consuming technique but it provides a useful baseline for comparison. A keyword search through the associated time stamped video transcript provides a time-indexed pointer into the video stream for each instance where the keyword occurred. For example, if the user performed a keyword search on Peru, the result provided a pointer to the video for each location where the word Peru was spoken. Because a keyword search may provide multiple pointer references to the same story, it was intuitive that a story segment search is superior to a keyword search.

In our experiment, a user was therefore requested to find a story on three topics over a one-month time period. The user was asked to find these stories by using three techniques: linear search, keyword search and story segment search. The linear search was performed with a VCR with a shuttle-control. The keyword search was performed by searching the multimedia database for dates and times when the news program referenced the given keyword. For each date and time retrieved, the user manually searched through the videotape using the VCR shuttle control. The story segment search was performed using the Broadcast News Navigator system. The data set was the nightly half-hour CNN PrimeNews™ programs from 14 Dec. 1996 to 13 January 1997.

TABLE 7

Search Time and Number of Stories Found for Linear, Keyboard and BNN Searches

| | Actual # | Manual Search | | Keyword Search | | BNN Search | |
|---|---|---|---|---|---|---|---|
| | Stories | Time | Number | Time | Number | Time | Number |
| Peru | 17 | 3:10 | 16 | 2:40 | 18 | 0:02 | 22 |
| Middle East | 16 | 3:16 | 16 | 2:53 | 17 | 0:02 | 25 |
| Gulf War Chemicals | 3 | 4:30 | 3 | 0:33 | 3 | 0:02 | 4 |
| Average | | 3:39 | | 2:02 | | 0:02 | |

Table 7 shows the results of searching for three different topics where the "Actual # Stories" column indicates the number of relevant stories as determined by a human expert for each of the three given topics, for example, Peru, Middle East, Gulf Ware Chemicals. As seen in the Table, the manual search took 80% longer on average than the keyword search and 10,850% longer than the BNN search.

There were three anomalies discovered with the test. First, in the manual search, when a story was discovered in a news program, the searcher stopped for the remainder of that news program with the assumption that the story would not reoccur. Second, in the keyword search, keywords detected in the first minute of a broadcast were ignored because they pointed to the highlights of the news. This method had better recall and retrieved more of the relevant stories because the stories that re-occurred in the news broadcast were detected. Third, in the BNN search, the system over-generated story segments, which increased the number of stories that were found. In three cases of over segmentation, a story crossed a commercial boundary and was broken into two individual stories. In one case, a story consisted of two sub-stories, the Peruvian Army and the Peruvian Economy.

Limitations and Future Directions

An important area for further evaluation is to enhance the media selection and media generation algorithms to enhance their generality and minimize program specific dependencies. The system can be extended to incorporate automated story summarization tailored to particular users interests. Another important area is in human factors and usability questions surrounding which types of summaries, and which mix of media, are most effective for which kinds of information seeking task. Additional sources of information in the audio channel can be exploited that may facilitate summarization, such as emphasis detection (via intonation), music detection, and spoken language transcription. In the imagery channel, it is also possible to use more sophisticated analyses to enable finer control over keyframe selection. Spoken language transcription may also effect performance results of story segmentation and named entity tagging.

Video and audio segmentation techniques can be used to detect the broadcast and commercial boundaries in an initial pass of the multimedia source. With these detected boundaries, it is possible to then process the smaller story segments simultaneously as opposed to processing the complete broadcast serially further enhancing performance. The following cues may also be added as input to the audio and video stream processing:

Jingle and music detection (audio)
    Speaker identification (audio)
    Face recognition and identification (video)
    Text extraction (video)
    Object recognition (video)
    Speaker identification (video and audio)

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

APPENDIX A

| Start State | End State | Transition Cue |
|---|---|---|
| 1 | 2 | CNN PrimeNews |
| 2 | 3 | Anchor to Weather |
| 2 | 3 | Triple_Greater |
| 2 | 3 | Name Colon |
| 2 | 3 | PRIMENEWS |
| 2 | 3 | Signon |
| 2 | 3 | Anchor to Reporter |
| 2 | 3 | Reporter to Anchor |
| 2 | 3 | Weather to Anchor |
| 2 | 3 | Story Preview |
| 2 | 3 | Story Preview |
| 2 | 3 | Im Start |
| 2 | 3 | Double_Greater |
| 2 | 17 | LogoBegin |
| 3 | 4 | TIME |
| 3 | 4 | Signon |
| 3 | 4 | Im Start |
| 3 | 4 | PRIMENEWS |
| 3 | 5 | Reporter to Anchor |
| 3 | 5 | Anchor to Reporter |
| 4 | 5 | Triple_Greater |
| 4 | 5 | PRIMENEWS |
| 4 | 5 | Signon |
| 4 | 5 | Im Start |
| 4 | 5 | Reporter to Anchor |
| 4 | 5 | Anchor to Reporter |
| 4 | 5 | Double_Greater |
| 5 | 12 | DEFAULT |
| 6 | 5 | Triple_Greater |
| 6 | 7 | TIME |
| 6 | 7 | Reporter to Anchor |
| 6 | 7 | Weather to Anchor |
| 6 | 13 | SILENCE_START |
| 6 | 13 | BlackScreen |
| 6 | 13 | BLANK_LINE |
| 6 | 15 | PRIMENEWS |
| 6 | 15 | Story Preview |
| 6 | 18 | Im End |
| 6 | 18 | Signoff |
| 6 | 22 | Anchor to Reporter |
| 14 | 5 | Triple_Greater |
| 14 | 5 | Name Colon |
| 14 | 6 | Anchor to Reporter |
| 14 | 7 | Double_Greater |
| 14 | 8 | SILENCE_START |
| 14 | 8 | BLANK_LINE |
| 14 | 13 | TIME |
| 14 | 15 | PRIMENEWS |
| 14 | 15 | Story Preview |
| 14 | 19 | Im End |
| 14 | 19 | Signoff |
| 15 | 5 | Triple_Greater |
| 15 | 6 | Anchor to Reporter |
| 15 | 7 | TIME |
| 15 | 8 | SILENCE_START |
| 15 | 8 | BLANK_LINE |
| 15 | 8 | BlackScreen |

APPENDIX A-continued

| Start State | End State | Transition Cue |
|---|---|---|
| 15 | 19 | Im End |
| 15 | 19 | Signoff |
| 17 | 3 | BlackScreen |
| 17 | 3 | Triple_Greater |
| 17 | 3 | Im Start |
| 17 | 3 | Story Preview |
| 17 | 3 | Anchor to Weather |
| 17 | 3 | Story Preview |
| 17 | 3 | Weather to Anchor |
| 17 | 3 | Anchor to Reporter |
| 17 | 3 | Signon |
| 17 | 3 | Double_Greater |
| 17 | 3 | PRIMENEWS |
| 17 | 3 | Name Colon |
| 18 | 5 | Triple_Greater |
| 18 | 5 | Name Colon |
| 18 | 7 | TIME |
| 18 | 19 | PRIMENEWS |
| 18 | 19 | Im End |
| 18 | 19 | Signoff |
| 19 | 5 | Triple_Greater |
| 19 | 20 | SILENCE_START |
| 19 | 20 | BLANK_LINE |
| 19 | 20 | BlackScreen |
| 20 | 21 | DEFAULT |
| 22 | 6 | TIME |
| 22 | 7 | Reporter to Anchor |
| 22 | 18 | Im End |
| 22 | 18 | Signoff |

What is claimed is:

1. A method for automatically processing a representation of a multimedia presentation having multiple information streams contained therein, the method comprising the steps of:
   (a) selecting at least one contiguous portion of the multimedia presentation as a story segment;
   (b) extracting named entities from a text information stream corresponding to the story segment;
   (c) using extracted named entities as search criteria to select from among a plurality of story segments;
   (d) in response to a search query, presenting a list of named entities and their corresponding number of occurrences in story segments over a selected time period; and
   (e) extracting story summary data using the named entities as a basis, wherein the step of extracting story summary data additionally comprises the steps of:
       (i) determining a frequency of occurrence for the named entities per sentence in a story segment; and
       (ii) selecting a sentence with a greatest named entity frequency of occurrence as a topic sentence.

2. A method as in claim 1 wherein step (ii) of selecting a sentence additionally comprises the step of:
   (iii) if more than one sentence has a greatest named entity frequency of occurrence, selecting the sentence closest to the beginning of the story as the topic sentence.

3. A method as in claim 1 wherein step (a) of selecting at least one contiguous portion of the multimedia presentation as a story segment, additionally comprises a step of:
   matching a model of expected event cues with observed event cues in at least one information stream.

4. A method as in claim 1 further comprising the step of:
   (f) selecting a key frame from an imagery stream in the multimedia presentation representative of the segment based upon the type of segment.

5. A method as in claim 4 wherein the story segment contains a reporter segment and the key frame is selected from the middle of the reporter segment.

6. A method as in claim 4 wherein the story segment contains an anchor booth segment and the key frame is selected from the middle of the anchor booth segment.

7. A method for automatically processing a representation of a multimedia presentation having multiple information streams contained therein, the method comprising the steps of:
   (a) selecting at least one contiguous portion of the multimedia presentation as a story segment;
   (b) extracting named entities from a text information stream corresponding to the story segment;
   (c) using extracted named entities as search criteria to select from among a plurality of story segments;
   (d) in response to a search query, presenting named entities and their corresponding number of occurrences in story segments over a selected time period, the presenting of named entities in a form of a graph of a view of named entities and their corresponding frequencies of occurrences in story segments over a selected time period in response to a selection of a point on the graph of name entities, presenting the user with an overview of story segments containing the selected named entity.

8. A method as in claim 7 further comprising the steps of:
   (e) extracting text information from a text information stream corresponding to the story segment as text data;
   (f) extracting story summary data from the text data; and
   (g) linking together a stored representation of the text data, summary data, and named entity data for the story segment.

9. A method as in claim 8 wherein the method additionally comprises the steps of:
   (f) storing the representations of the text data, summary data, and named entity data for story segments as one or more files on a file server computer connected to a computer network; and
   (g) allowing access to the stored representations of news story segments available to a browser program running on at least one client computer connected to the computer network.

10. A method as in claim 7 further comprising the steps of:
    (e) extracting story summary data using the named entities as a basis.

11. A method as in claim 7 further comprising the steps of:
    (e) in response to a search query, selecting multiple contiguous portions of the multimedia presentation as story segments; and
    (f) in response to a search query, presenting a summary display having multiple summary presentation elements representative of the extracted story segments.

12. A method as in claim 11 wherein the summary presentation elements from a given story segment are displayed together.

13. A method as in claim 12 wherein the summary presentation elements comprise extracted named entities.

14. A method as in claim 12 wherein the summary presentation elements comprise summary sentences.

15. A method as in claim 12 wherein the summary presentation elements comprise a hyperlink to a source media element of the segment.

16. A method as in claim 12 wherein step (f) of presenting a summary display additionally comprises the step of:
  presenting extracted named entities in a hypertext link form such that hyperlinks lead to presentation of additional elements of the story segment.

17. A method as in claim 11 wherein step (f) of presenting a summary display additionally comprises the step of:
  in response to a search query for a selected named entity, presenting a thumbnail view comprising key frames from multiple story segments containing the selected named entity.

18. A method as in claim 11 wherein step (f) of presenting a summary display additionally comprises the step of:
  in response to a search query for a story segments of a selected type, presenting a thumbnail view comprising key frames from multiple story segments of the selected type.

19. A method as in claim 7 additionally comprising the steps of:
  (e) extracting information from at least one information stream corresponding to the story segment as source data;
  (f) extracting a summary representation of the story segment from the source data; and
  (g) presenting a plurality of related story segments using a layered hierarchical presentation of the summary representations at a relatively high hierarchical level and the source data at a relatively low hierarchical level, together with hyperlinks permitting navigation among related story segments to a desired hierarchical level of representation.

20. A method as in claim 19 wherein the information stream is a text stream, the source data is text relating to a story segment, and the summary representation includes extracted named entities.

21. A method as in claim 19 wherein the information stream is an image stream, the source data is image data for the complete story segment, and the summary representation is a key frame.

22. A method as in claim 7 additionally comprising the step of:
  (e) in response to a search query, presenting a graph of named entities and their corresponding frequency of occurrences in story segments over a selected time period.

23. A method as in claim 7 additionally comprising the step of:
  (f) in response to a search query for a story segments of a selected type, presenting a thumbnail view comprising key frames from multiple story segments of the selected type.

24. A method as in claim 7 wherein the step of presenting named entities and their frequency of occurrences over a selected time period further comprises presenting the view of named entities as a graph.

25. A method as in claim 24 additionally comprising:
  (e) in response to selection of a point on the graph of named entities, presenting the user with an overview of story segments containing the selected named entity.

* * * * *